(12) United States Patent
Buether

(10) Patent No.: US 10,228,251 B1
(45) Date of Patent: Mar. 12, 2019

(54) ENHANCING GEOCODING ACCURACY

(71) Applicant: Amazon Technologies, Inc., Reno, NV (US)

(72) Inventor: John Nicholas Buether, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 15/353,630

(22) Filed: Nov. 16, 2016

Related U.S. Application Data

(62) Division of application No. 14/230,050, filed on Mar. 31, 2014, now Pat. No. 9,529,089.

(51) Int. Cl.
| | |
|---|---|
| *G01S 19/05* | (2010.01) |
| *G01S 19/06* | (2010.01) |
| *G01S 19/07* | (2010.01) |
| *G01C 21/16* | (2006.01) |
| *G01S 19/47* | (2010.01) |

(52) U.S. Cl.
CPC .............. *G01C 21/16* (2013.01); *G01S 19/47* (2013.01)

(58) Field of Classification Search
CPC ................................ G01C 19/05; G01C 21/16
USPC ......................................... 701/469, 500, 512
See application file for complete search history.

(56) References Cited

U.S. PATENT DOCUMENTS

| | | | | |
|---|---|---|---|---|
| 5,301,114 A * | 4/1994 | Mitchell | ................ | G01C 21/16 342/358 |
| 7,409,291 B2 | 8/2008 | Pasolini et al. | | |
| 8,321,128 B2 | 11/2012 | Park | | |
| 2004/0172167 A1* | 9/2004 | Pasolini | .................. | G01P 13/00 700/245 |
| 2008/0059068 A1* | 3/2008 | Strelow | ................ | G05D 1/0246 701/469 |
| 2009/0005985 A1* | 1/2009 | Basnayake | ............. | G01C 25/00 701/501 |
| 2009/0247186 A1* | 10/2009 | Ji | .............................. | G01S 5/02 455/456.1 |
| 2010/0057360 A1* | 3/2010 | Ohkubo | ................. | G01C 21/16 701/500 |
| 2010/0121573 A1* | 5/2010 | Imafuku | .............. | G01C 21/165 701/500 |
| 2010/0241355 A1* | 9/2010 | Park | ........................ | G01C 21/30 701/533 |
| 2010/0250134 A1* | 9/2010 | Bornstein | .............. | G01C 21/12 701/500 |
| 2010/0312461 A1* | 12/2010 | Haynie | .................. | B61L 25/025 701/117 |
| 2011/0066377 A1* | 3/2011 | Takaoka | ............... | G01C 21/165 701/500 |

(Continued)

*Primary Examiner* — Krishnan Ramesh
(74) *Attorney, Agent, or Firm* — Athorus, PLLC

(57) ABSTRACT

Where a mobile computer device having a position sensor, such as a GPS sensor, and an accelerometer is configured to estimate a geographic position of the mobile computer device using the position sensor, the accuracy of such positions may be enhanced by correlating accelerations of the mobile computer device, as determined by the accelerometer, against the positions of known surface features within a vicinity of the estimated positions. If the observed accelerations are consistent with one of the known surface features, the location of the mobile computer device may be correlated with the location of the one of the known surface features.

20 Claims, 11 Drawing Sheets

(56) References Cited

U.S. PATENT DOCUMENTS

| | | | | |
|---|---|---|---|---|
| 2011/0071759 A1* | 3/2011 | Pande | ................... | G01C 21/165 |
| | | | | 701/469 |
| 2011/0112764 A1* | 5/2011 | Trum | ................. | G01C 21/3476 |
| | | | | 701/469 |
| 2011/0125403 A1* | 5/2011 | Smith | ................... | G01C 21/005 |
| | | | | 701/469 |
| 2011/0208496 A1* | 8/2011 | Bando | ..................... | G01S 19/49 |
| | | | | 703/2 |
| 2013/0214925 A1* | 8/2013 | Weiss | ................... | G08B 25/001 |
| | | | | 340/539.11 |
| 2014/0095009 A1* | 4/2014 | Oshima | ................ | G05D 1/0238 |
| | | | | 701/23 |

* cited by examiner

ENHANCING GEOCODING ACCURACY

CROSS-REFERENCE TO RELATED APPLICATIONS

This application is a divisional of U.S. patent application Ser. No. 14/230,050, filed Mar. 31, 2014, the contents of which are incorporated by reference herein in their entirety.

BACKGROUND

Many modern mobile computer devices, such as smartphones, tablet computers or other general or special purpose machines, include one or more components for determining information regarding a device's position, orientation, velocity or acceleration. For example, some such mobile computer devices may include Global Positioning System (or "GPS") transceivers for determining positions using data received from one or more orbiting satellites, or cellular telephone equipment configured to estimate (e.g., triangulate) a position using signals received from one or more cellular telephone network towers or other network sources. Moreover, some such devices may also include compasses for determining directions, gyroscopes for determining orientations and accelerometers for sensing accelerations.

A GPS-enabled device may determine its position by interpreting signals that are received from multiple GPS satellites. A distance between the device and a GPS satellite may be determined by calculating a "time of flight" between the GPS satellite and the device for each such signal, which is assumed to travel at approximately the speed of light. Where three or more such signals are interpreted, the device may be determined to be located at a specific point on the planet to within a certain degree of accuracy or tolerance, commonly on the order of two to ten meters.

Occasionally, position information determined using GPS satellites and GPS-enabled equipment may be inaccurate, irrelevant or unavailable. For example, like any computer device, most GPS-enabled equipment requires an initialization period during which the GPS position information determined by such equipment is unreliable. Furthermore, where an environment includes many natural or artificial obstructions, such as tree limbs, office towers, mountains, walls or ceilings, the receipt of GPS signals by a GPS-enabled device may be delayed or otherwise interpreted as having arrived in an untimely manner. Moreover, even where GPS position information that is obtained or determined by a mobile computer device is within an acceptable degree of accuracy or tolerance (e.g., within two to ten meters), the information may be insufficient or unreliable for some purposes. For example, where an accurate position is desired in a dense, urban environment having a large number of individual locations (e.g., addresses or other points of interest) within a small, defined area, determining a precise location within the area may be of paramount importance.

DETAILED DESCRIPTION

Figure 1:
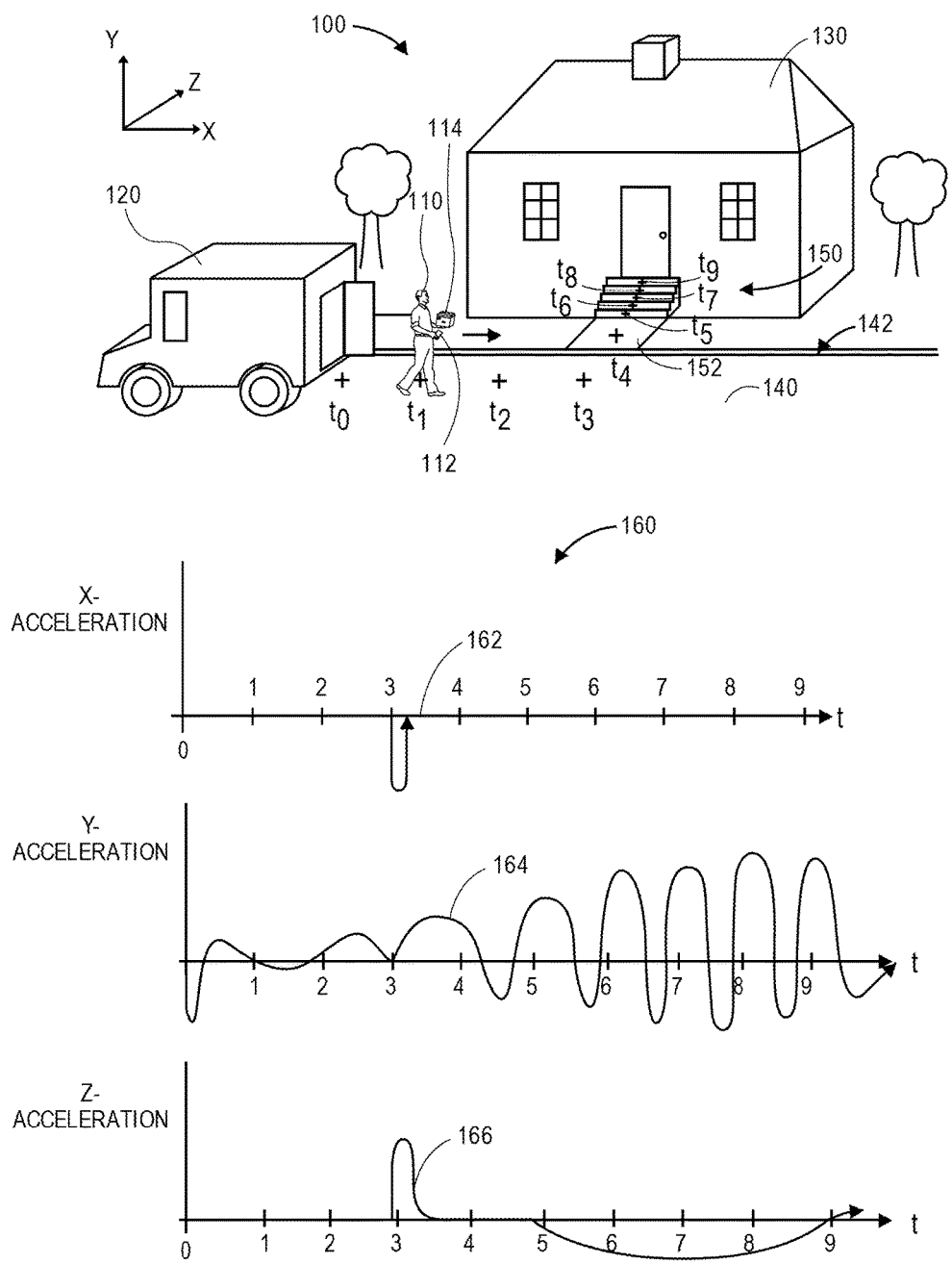
FIG. 1 is a view of one system for enhancing geocoding accuracy in accordance with embodiments of the present disclosure.

As is set forth in greater detail below, the present disclosure is directed to enhancing the accuracy of geocoding processes or geocoded information using data captured from one or more on-board sensors associated with a mobile computer device. Specifically, the systems and methods disclosed herein are directed to enhancing the quality of a geocoding process by determining a geographic location of a mobile computer device to within a degree or level of accuracy, determining information or data regarding net accelerations, velocities or orientations of the mobile computer device, or of a user of the mobile computer device, or of a vehicle in which the mobile computer device is carried. Such information or data may be compared against real-world geographic information or constraints in order to confirm that the determined geographic location is correct, or to otherwise enhance the degree or level of accuracy of the determined geographic location. Additionally, the systems and methods disclosed herein are also directed to using such information or data to build a map or graph of surface features reflecting the topographical elements of an environment in which the mobile device, the user of the mobile device, or a vehicle in which the mobile device is carried, may be situated. Such surface features may be identified and mapped or graphed by an engine or module operating according to one or more machine learning algorithms or techniques, which may recognize where net accelerations, velocities or orientations of the mobile computer device may be consistent with a type or form of surface feature (e.g., slopes, surfaces or terrain aligned at any angle).

According to some embodiments of the present disclosure, information or data regarding accelerations, velocities or orientations may be obtained from an accelerometer, a gyroscope, a compass or any other like machine or component that may be associated with the mobile computer device, and may determine such accelerations, velocities or orientations in one or more directions in three-dimensional space, viz., along or about x-, y- or z-directions or axes. Moreover, information or data regarding accelerations, velocities or orientations may be processed in order to confirm a location of a mobile computer device, or to enhance the accuracy of a position of the mobile computer device that may be obtained using one or more geolocators, e.g., GPS sensors in communication with one or more GPS satellites, or one or more applications or modules for triangulating a position using cellular telephone network transmissions or other network signals.

Further, such information or data may be further processed in order to identify one or more surface features (e.g., natural terrain or artificial elements such as stairs or ramps) based on events or occurrences associated with the mobile computer device which relate to an environment in which the mobile computer devices is situated. Such information or data may be expressed in quantitative terms such as distances, elevations or angles, and also in qualitative terms such as "step up," "step down," "normal gait," "elevator up," and the like. Any number of inferences may be drawn or otherwise identified from such qualitative or quantitative information or data, which may be affiliated with one or more existing real-world geographic constraints such as pathways, stairways, hills, ramps, escalators or other features having corresponding variations in elevation and position, and may be correlated with two-dimensional or three-dimensional images (e.g., satellite or aerial photographs), topographical data, or information obtained from any other source. For example, where information or data regarding one or more surface features is identified based on net accelerations, velocities or orientations obtained from one or more sensors, intrinsic or extrinsic data may be identified and utilized to determine additional information regarding such surface features. Such intrinsic or extrinsic data may relate to specific surface features, e.g., unique topographical elements of terrain such as hills or artificial features such as ramps or stairs, that may be associated with a particular location, as well as surface features of a general kind or type, e.g., stairs constructed according to zoning requirements in existence in a given location or at a certain time, or ramps having slopes in compliance with one or more accessibility ordinances or statutes.

Referring to FIG. 1, one system 100 for enhancing geocoding accuracy is shown. The system 100 of FIG. 1 includes a worker 110, a delivery vehicle 120 such as a truck, a destination 130 (e.g., a home), as well as a surface feature 140 in the form of a street, and a surface feature 150 in the form of a set of stairs leading to the destination 130. The system 100 also includes another surface feature 142 in the form of a curb or other vertical barrier between a piece of property and a street, as well as a surface feature 152 comprising a walkway or other sloped region extending from the surface feature 142 to the surface feature 150. Additionally, the system 100 of FIG. 1 further includes net acceleration data 160 in the form of plots 162, 164, 166 of net accelerations over time along the orthogonal x-, y- and z-axes, respectively.

Referring to FIG. 1, the worker 110 is carrying a handheld device 112 and a parcel 114 from the delivery vehicle 120 to the destination 130 during a period of time period extending from time $t_0$ to time $t_9$. Specifically, as shown in FIG. 1, the worker 110 is shown as descending from the delivery vehicle 120 at time $t_0$, and walking along the surface feature 140 from time $t_0$ to time $t_3$, before turning left at time $t_3$ and walking over the surface feature 142 and onto the surface feature 152. From time $t_4$ to $t_5$, the worker 110 walks along the surface feature 152 toward the surface feature 150, and from time $t_6$ to time $t_9$, the worker 110 ascends the surface feature 150 toward the destination 130.

The net acceleration data 160 of FIG. 1 also shows the net accelerations of the worker 110, which may be derived based on raw information or data obtained using one or more sensors associated with the handheld device 112, between time $t_0$ and time $t_9$ along the orthogonal x-, y- and z-axes. Such sensors may include but are not limited to geolocator applications or components (e.g., GPS sensors or triangulation modules which determine locations based on cellular telephone signals or other network signals, such as those received from one or more wireless fidelity routers), accelerometers, gyroscopes, compasses or any like devices or components for determining an acceleration, a velocity or an angular orientation of the handheld device 112. The raw information or data obtained from the various sensors that are available to the handheld device 112 may be fused or otherwise aggregated into a common set and filtered or processed in order to remove any variations or fluctuations expressed therein, and to identify net accelerations, velocities or orientations of the handheld device 112 or the worker 110 based on such raw information or data, e.g., according to one or more sensor fusion algorithms or techniques.

For example, the raw information or data may reflect localized variations in acceleration, velocity or position due to erratic or temporary eccentricities of the motion of the worker 110 (e.g., swings of arms or legs, twists of hips or heads, or temporary pauses or increases in speed), or noise or drift that may be associated with an accelerometer, a gyroscope or a compass over time. Additionally, the raw information or data may be subject to the effects of gravity. The raw information or data collectively obtained from all available sensors may be processed according to one or more high-pass or low-pass filters or any other processes or techniques in order to determine true, net accelerations, velocities or orientations of the worker 110, or of the handheld device 112, over time. Such net accelerations, velocities or orientations may be used to estimate a location of the worker 110 or of the handheld device 112, or to enhance the accuracy of a location identified by a geolocator or like means. Additionally, the net accelerations, velocities or orientations may be further utilized to identify one or more surface features in a vicinity of the worker 110 or of the handheld device 112 in accordance with the present disclosure.

As is shown in the plot 162, the net acceleration of the worker 110 along the x-axis is approximately zero until time $t_3$, when the net acceleration temporarily drops to a negative value as the advancement of the worker 110 along the along the x-axis comes to a halt and never changes thereafter. As is also shown in the plot 164, the net acceleration of the worker 110 along the y-axis is substantially periodic until time $t_3$, corresponding to the varying steps of the worker 110 along the surface feature 140. The net acceleration along the along the y-axis then increases as the worker 110 steps up onto the surface feature 142 and the surface feature 152, and continues substantially periodically until approximately time $t_5$, when the worker 110 ascends each of the steps associated with the surface feature 150. As is further shown in the plot 166, the net acceleration of the worker 110 along the z-axis is substantially periodic until time $t_3$, when the net acceleration increases as the worker 110 turns left (viz., in the positive z-axis direction) and begins to decrease at time $t_5$ as the velocity of the worker 110 slows while the worker 110 ascends the steps of the surface feature 150.

Accordingly, as is shown in FIG. 1, using information regarding accelerations of a computer device, such as the net accelerations of the handheld device 112 in the x-, y- and z-directions or along the x-, y- and z-axes, information regarding a position or a velocity of the computer device over time may be determined with regard to various surface features, such as the surface features 140, 142, 150, 152. The net accelerations may be evaluated using one or more mathematical models or techniques, which may be used to determine positions or velocities based on features of such accelerations, including average accelerations or standard deviations thereof along one or more axes, e.g., single-axis or multi-axial scalars or vectors. Such information may be used to verify or confirm a position of the computer device as may be determined by other means, e.g., a GPS sensor associated with the computer device, and may further enhance the accuracy of positions determined by such means, or resolve discrepancies between a position determined by such means and real-world geographic constraints.

For example, in evaluating acceleration data such as the net accelerations shown in the plots 162, 164, 166 of FIG. 1, the times between peak accelerations, or the slopes or rates of change of such accelerations, may be used to derive velocities or positions, e.g., by integrating or differentiating functions corresponding to accelerations, velocities or positions. Additionally, the net accelerations and other information or data may also be evaluated in order to recognize one or more surface features associated with real-world geographic constraints, and to generate a map or graph of such surface features using an identification engine or module configured to recognize one or more of the features based on such accelerations, velocities or positions.

Today, many modern mobile computer devices (e.g., smartphones, tablet computers or laptop computers) are able to detect and record one or more physical movements. For example, many smartphones, tablets or laptops include internal hardware components or software applications that may be utilized to determine the position, velocity, acceleration or orientation of such devices. Where a computing device includes a GPS receiver, an accelerometer, a gyroscope or a compass, the position, velocity, acceleration or orientation of the computing device may be determined and recorded using such components.

Mobile computer devices may determine their respective positions using various means or methods, such as a locating module that obtains a geocode or other data regarding a location of the mobile computer device at an associated level of accuracy or tolerance. Where a mobile computer device includes cellular telephonic equipment, such equipment may detect signals from one or more network sources, and use such signals to estimate, e.g., triangulate, a position of the mobile computer device. More commonly, such devices frequently include GPS sensors, microchips or other components that determine locations by interpreting signals from one or more GPS satellites. The GPS system comprises twenty-four satellites that circle the planet every twelve hours at an altitude of approximately eleven thousand nautical miles, and are maintained aloft by the United States Air Force. GPS-equipped computer devices typically operate by measuring the transit times of signals received from multiple satellites, which generally travel at the speed of light (viz., 186,000 miles per second, or $3.0 \times 10^8$ meters per second), and determining distances to the respective satellites based on the transit times. Using three or more such signals, an approximate position of a computer device may be determined to within a defined degree or level of accuracy. By some estimates, American GPS satellites may provide users with an accuracy level of approximately 7.8 meters (m), ninety-five percent of the time, anywhere around the planet.

Occasionally, however, some errors or inaccuracies may be encountered when determining positions using GPS systems. For example, propagation delays in the transmission of satellite signals may affect the speed of such signals through the ionosphere or troposphere. Additionally, any clocking delays may occasionally affect a determination of a distance between a device and a satellite, and a position of the device based on such a distance. Moreover, where GPS signals from one or more signals are blocked or impaired by vegetation or man-made structures, the accuracy of a position determined based on the interpretation of such signals may be called into question. Furthermore, in some applications, a position of a mobile computer device may be desired at a greater level of accuracy or precision than is currently available through the use of standard GPS systems and technology.

An accelerometer is an electromechanical device that is configured to generate a signal corresponding to accelerations, viz., changes in velocity over time, that are experienced by the device along one or more orthogonal axes or in one or more directions. By detecting accelerations, an accelerometer may be used to measure a variety of other data that may be related to accelerations, including velocities, reaction forces, inclinations, vibrations or the like. Accelerometers may be configured to determine accelerations in a single direction or along a single axis, or in multiple directions or along multiple axes (viz., x-, y- or z-accelerations), and to provide outputs regarding such accelerations in the form of scalars or vectors. For example, many mobile computer devices feature tri-axial accelerometers, which may determine accelerations in three axes or dimensions at once.

A gyroscope is a mechanical or electromechanical device that is configured to determine or maintain an orientation or velocity, and to measure angular motion relative to one or more inertial frames of reference. Gyroscopes are commonly used in inertial navigation systems and also in consumer electronics, and are commonly found in most forms of mobile devices such tablet computers, smartphones or the like. Traditionally, gyroscopes include rotors having fixed spin axes that are mounted to or within spin gimbals which may respond to torques with a form of motion called precession, in which the axis of rotation is reoriented in order to offset the torques. Such traditional gyroscopes, or more modern gyroscopes having one or more electronic components such as electrodes or capacitors, may be provided in connection with one or more devices or apparatuses for the purpose of determining one or more angular accelerations, velocities or orientations of such devices or apparatuses accordingly. A compass is a device that determines an orientation or a direction with regard to a fixed frame of reference associated with the surface of the Earth. Most magnetic compasses include magnetized needles that align themselves with the Earth's magnetic field, as defined by the orientation of the Earth's magnetic poles. Other forms of compasses, including gyrocompasses, may also be provided for the purpose of determining directions with regard to fixed frames of reference.

In accordance with the present disclosure, information or data obtained from any number or type of sensors associated with a mobile computer device may be aggregated and considered together in order to determine a net acceleration or net velocity of the mobile computer device, or of a user of the mobile computer device. According to one or more sensor fusion processes, information or data obtained as outputs from accelerometers, gyroscopes, compasses or other like sensors may be processed and combined into a fused output set that minimizes the expected errors associated with the individual outputs from such sensors. By aggregating information or data obtained from multiple sensors, the information or data of the fused output set may be expected to have a greater level of accuracy or reliability than information or data obtained from a single sensor. The net effect of the accelerations or velocities of the mobile computer device may be identified based on the fused output set, and utilized to determine a position of the mobile computer device, to enhance the accuracy of an estimated position of the mobile computer device, or to generate a map or graph of surface features in a vicinity of the mobile computer device.

Dead reckoning is a general term for a procedure by which a position of an object at a given time is predicted using a previously established position of the object (which is sometimes called a "fix") and information regarding a kinematic state of the object. For example, where an initial position and a velocity of an object are known, a position of the object at a later time may be projected with respect to the initial position by integrating a function representative of the velocity (i.e., both speed and direction) over the elapsed time. Because dead reckoning relies on projections, one or more systematic and/or random errors may develop based on uncertainties of determined positions, velocities, or accelerations, and may be cumulative over time. For example, if the object were to begin moving from an accurately determined position, and the components of the velocity (e.g., speed and direction components) are determined with equal levels or degrees of accuracy, then a dead reckoning of the object would include areas of uncertainty which would grow or increase in equal proportion in all directions according to a technique known as "fix expansion." A two-dimensional area of uncertainty would be expressed as a circle, an ellipse or a similar shape corresponding to the known errors associated with the position of the object in two dimensions over time, taking into account any errors associated with the position, the direction or the speed of travel of the object. Likewise, a three-dimensional volume of uncertainty may be expressed as a sphere or other similar shape corresponding to the known errors associated with the position of the object in three dimensions over time.

For example, when dead reckoning an object's travel from a fix, a circle corresponding to the errors associated with determining the fix would be drawn around the fix, and would be expanded in size based on the possible error or uncertainty factors. If one of the velocity components (e.g., a direction or a speed) is determined with a different level of accuracy than another velocity component, then the area of uncertainty would be drawn in the form of an ellipse or other applicable non-circular shape.

The systems and methods of the present disclosure are directed to acquiring information or data, e.g., topographical data or environmental feature information, from a variety of sensors associated with a mobile computer device, including but not limited to a smartphone, a tablet computer, or any other like machine. The information or data may then be processed and consumed for any function or application, such as to identify a position associated with the information or data, to enhance the accuracy of a dead reckoning system or a position estimated by such a system, or to generate a map or graph of surface features in a vicinity of the mobile computer device. Any information regarding the positions, the enhancements, or the maps or graphs of surface features may be maintained in on or more data stores and utilized for any relevant purpose.

According to one embodiment of the present disclosure, information or data regarding a position of a mobile computer device may be obtained by standard means, e.g., using a GPS sensor or by triangulating signals received from cellular towers or from other network sources (e.g., one or more wireless fidelity routers). Additionally, information or data regarding the accelerations, velocities or orientations of the mobile computer device may be obtained from one or more onboard sensors of the mobile device e.g., one or more accelerometers, gyroscopes, compasses or other like components, and mapped to one or more real-world geographic constraints. Where accelerations of the mobile computer device are observed as a worker or vehicle carries or operates the mobile computer device while traveling upon an area having one or more surface features, a location of worker or the vehicle may be determined by correlating the observed accelerations to the surface features within the area, which may have varying topographical characteristics.

For example, as is discussed above with regard to the system 100 of FIG. 1, accelerations, velocities or orientations of the handheld device 112 operated by the worker 110 may be observed in one or more directions or along one or more axes (viz., x-, y- or z-accelerations) and used to determine information regarding the worker's travels along various surface features, including changes in direction (e.g., left or right turns, or ascending or descending ramps or stairs) or changes in speed (e.g., speeding up or slowing down). Such accelerations, velocities or orientations may be used to enhance the accuracy of a position determined by a location provider, e.g., a GPS sensor or cellular telephonic equipment, by confirming a location within an area of certainty at which a worker is located at a given time. Moreover, such accelerations, velocities or orientations may further be used to construct a virtual map of an area based on the travels of a worker who is carrying a mobile computer device having a variety of sensors (e.g., an accelerometer, a gyroscope or a compass) in one or more directions or along one or more axes. Further, the monitoring of such accelerations, velocities or orientations, or the mapping of such accelerations, velocities or orientations to surface features, may be automatically commenced or initiated by a sensed triggering event. The sensed triggering event may be related to the operation of the mobile computer device, e.g., providing power to the device, or activating an application on the device, or may comprise a recognizable action or a pattern of one or more accelerations or motions.

The systems and methods disclosed herein provide a number of advantages over prior art position determining systems. For example, where a position is determined in a dense environment having a number of addresses or points of interest within an area of uncertainty associated with the position, some embodiments of the present disclosure may enhance the quality or accuracy of the position determination by mapping net acceleration data to surface features associated with the position, e.g., natural terrain or artificial elements in a vicinity of the position, and more precisely determining where, within the area of uncertainty, a mobile computer device is actually located. Moreover, where a mobile computer device includes not only a location provider (e.g., a GPS sensor) but also one or more sensors (e.g., an accelerometer, a gyroscope or a compass), the accuracy of a position obtained from the location provider may be enhanced wholly within the mobile computer device and without resort to any extrinsic sources or systems. Furthermore, by augmenting positions determined from a location provider, such as a GPS sensor, with net acceleration data, fewer instances of geocoding may be required in order to more accurately estimate a location of the mobile computer device. Additionally, a position may be geocoded from net acceleration data alone, thereby permitting a position to be determined even in the absence, failure or unavailability of an extrinsic positioning system, such as GPS or network signal triangulation. For example, a variety of sensors available on a mobile computer device may be used to determine accelerations, velocities and positions underground (e.g., while traveling through basements or mass transit systems), indoors (e.g., through large steel, concrete or other rigid structures) or behind walls, where signals are not easily transmitted to or received from such extrinsic systems.

The systems and methods disclosed herein may be used in any environment in which an enhanced determination of a position is desired. For example, where a worker delivers items, packages or parcels to a destination while traveling over a variety of surface features, one or more sensors may be used to capture information and data, and to derive net accelerations, during the worker's travels. Such information and data may augment position information obtained from a location provider, in order to determine a more precise path traveled by the worker. Such systems and methods are particularly useful where a location includes a number of possible destinations within a level of accuracy of a mobile computer device, or within an area of uncertainty defined by the position of the mobile computer device. For example, where multiple doors or entryways corresponding to unique, discrete destinations falling within an area of uncertainty associated with a position obtained using the mobile computer device includes, or where a location includes different destinations within the location, e.g., on different floors of a building, such as apartments or offices, net acceleration information or data determined using an accelerometer and one or more other sensors may be useful in pinpointing a specific position of the mobile computer device within the location. Finally, where real-world cartographic information regarding an area is unavailable, acceleration information or data obtained using an accelerometer and one or more other sensors may be helpful in identifying and mapping surface features within the area.

Figure 2A:
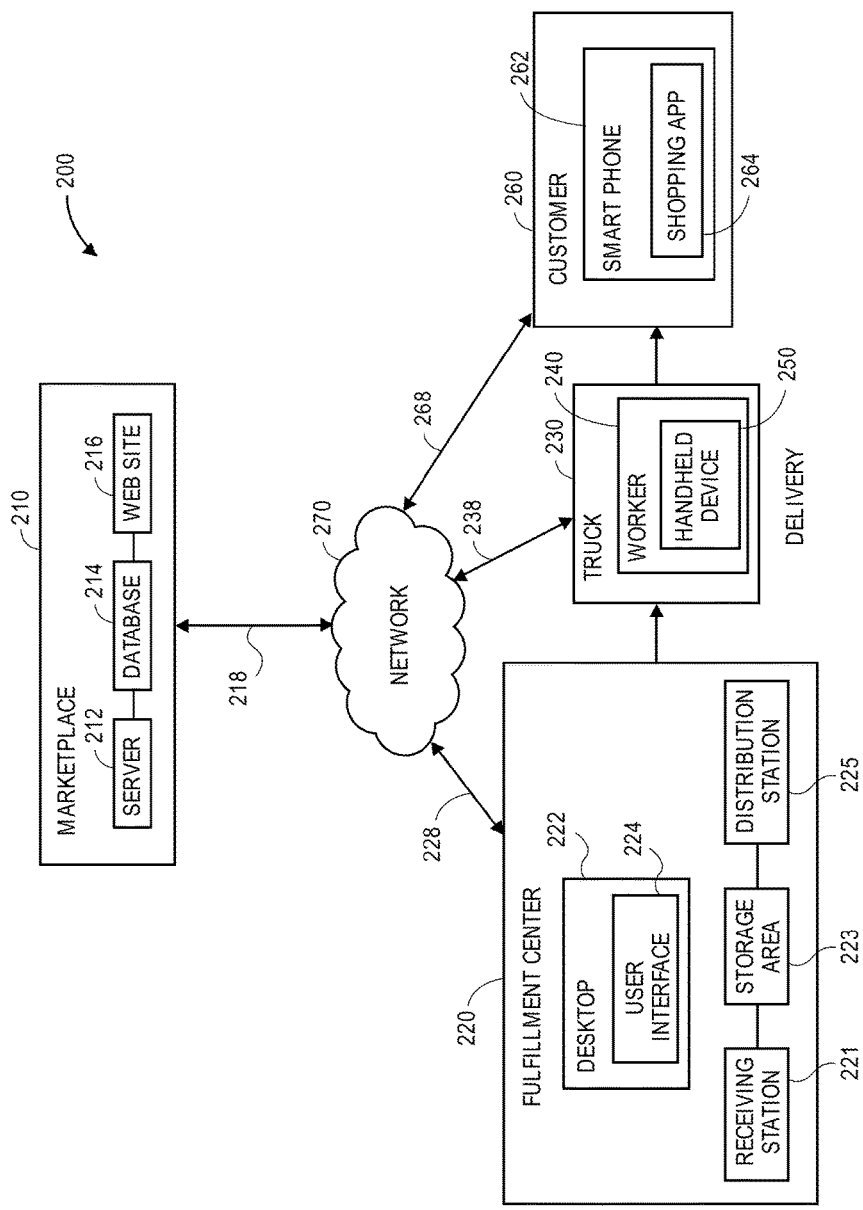
FIGS. 2A and 2B are block diagrams of components of one system for enhancing geocoding accuracy in accordance with embodiments of the present disclosure.
Figure 2B:
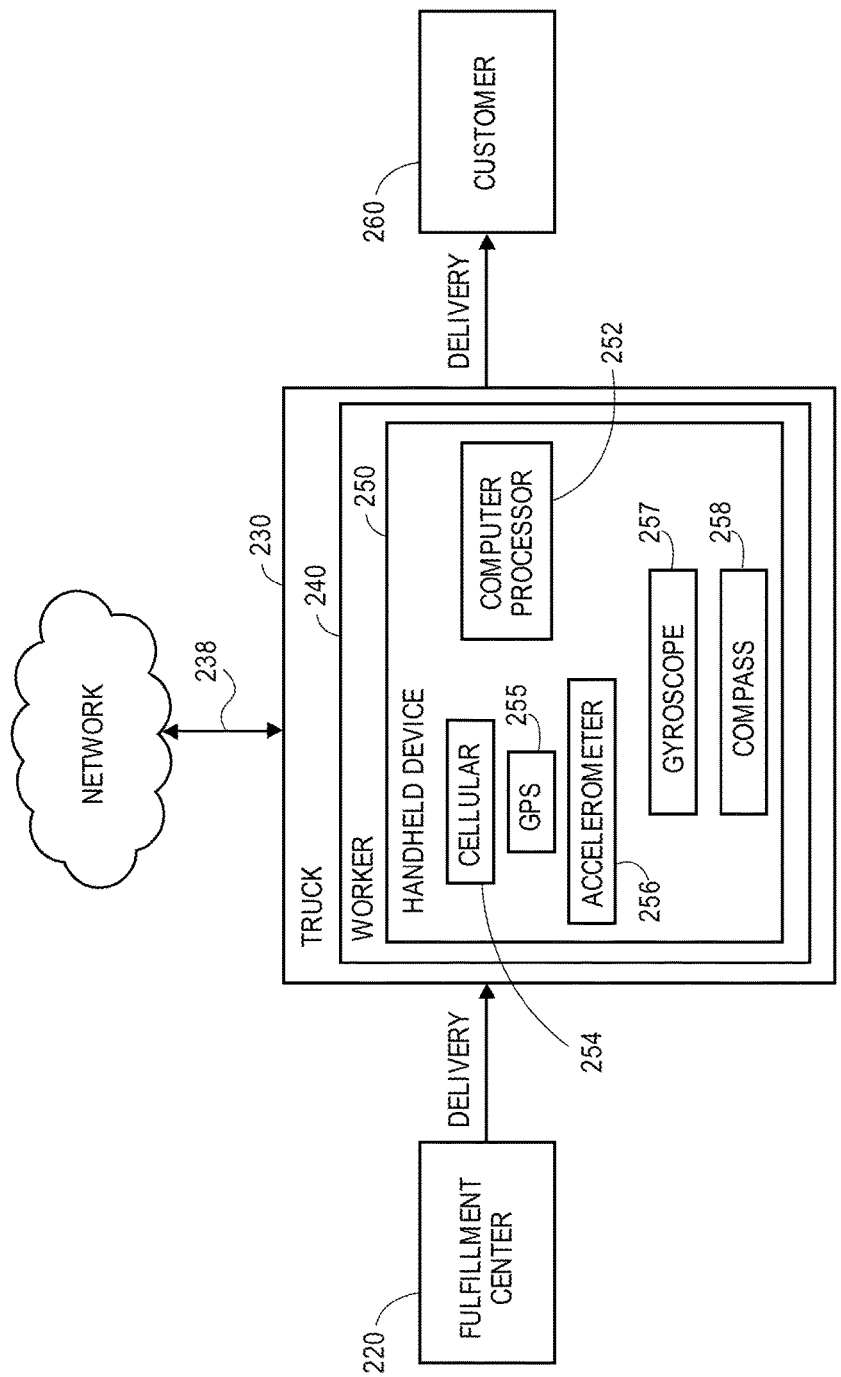

Referring to FIGS. 2A and 2B, a block diagram of one system 200 for enhancing geocoding accuracy is shown. As is shown in FIG. 2A, the system 200 includes a marketplace 210, a fulfillment center 220, a truck 230 including a worker 240 having a handheld device 250 and a customer 260 that are connected to one another across a network 270, such as the Internet.

The marketplace 210 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 212 and databases 214 for hosting a web site 216. The marketplace 210 may be physically or virtually associated with one or more storage or distribution facilities, such as the fulfillment center 220. The web site 216 may be implemented using the one or more servers 212, which connect or otherwise communicate with the one or more databases 214 as well as the network 270, as indicated by line 218, through the sending and receiving of digital data. Moreover, the database 214 may include any type of information regarding items that have been made available for sale through the marketplace 210, or ordered by customers, such as the customer 260, from the marketplace 210.

The fulfillment center 220 may be any facility that is adapted to receive, store, process and/or distribute items. As is shown in FIG. 2A, the fulfillment center 220 includes a desktop computer 222, as well as stations for receiving, storing and distributing items to customers, including but not limited to a receiving station 221, a storage area 223 and a distribution station 225.

The fulfillment center 220 may operate one or more order processing and/or communication systems using a computing device such as the desktop computer 222 and/or software applications having one or more user interfaces 224 (e.g., a browser), or through one or more other computing devices or machines that may be connected to the network 270, as is indicated by line 228, in order to transmit or receive information in the form of digital or analog data, or for any other purpose. The desktop computer 222 may also operate or provide access to one or more reporting systems for receiving or displaying information or data regarding workflow operations, and may provide one or more interfaces, such as the user interface 224, for receiving interactions (e.g., text, numeric entries or selections) from one or more operators, users or workers in response to such information or data. The desktop computer 222 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 221 may include any apparatuses that may be required in order to receive shipments of items at the fulfillment center 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 223 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 225 may include one or more regions or stations where items that have been retrieved from a designated storage area may be evaluated, prepared and packed for delivery from the fulfillment center 220 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 221 may be processed, and the items placed into storage within the storage areas 223 or, alternatively, transferred directly to the distribution station 225, or "cross-docked," for prompt delivery to one or more customers.

The fulfillment center 220 may further include one or more control systems that may generate instructions for conducting operations at one or more of the receiving station 221, the storage area 223 or the distribution station 225. Such control systems may be associated with the desktop computer 222 or with one or more other computing devices or machines, and may communicate with the receiving station 221, the storage area 223 or the distribution station 225 within the fulfillment center 220 by any known wired or wireless means, or with the marketplace 210, the truck 230, the worker 240 or the customer 260 over the network 270, as indicated by line 228, through the sending and receiving of digital data.

Additionally, the fulfillment center 220 may include one or more systems or devices (not shown in FIG. 2A) for determining a location of one or more elements therein, such as cameras or other image recording devices. Furthermore, the fulfillment center 220 may also include one or more workers or staff members, who may handle or transport items within the fulfillment center 220. Such workers may operate one or more computing devices or machines for registering the receipt, retrieval, transportation or storage of items within the fulfillment center, such as the desktop computer 222, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The truck 230 may be any motorized or non-motorized carrier or vehicle for transporting the worker 240 and one or more items, which may be prepared, packed and shipped in any type or form of container. For example, the truck 230 may be any type or form of light truck, medium truck or heavy truck, such as a platform truck, a flatbed truck, a tractor and/or trailer, as well as any form of van. Alternatively, those of ordinary skill in the pertinent arts will recognize that any other form or means of transportation may perform the functions of the truck 230 in accordance with the present disclosure, including but not limited to cars, trailers, freight cars, container ships or cargo aircraft (e.g., manned aircraft or unmanned aircraft, such as drones).

The worker 240 may handle or transport items within the fulfillment center 220, prepare such items for delivery to a customer, such as the customer 260, and deliver such items to the customer. For example, the worker 240 may retrieve items from a storage means within the storage area 223, transport the items to the distribution station 225, and prepare the items for delivery to one or more customers. Alternatively, the worker 240 may also transport, or "cross-dock," items directly from the receiving station 221 to the distribution station 225. Furthermore, the worker 240 may cause the placement of the prepared items onto a vehicle for delivery, such as the truck 230, and operate the truck 230 when causing a delivery of the items to a customer, such as the customer 260.

When the worker 240 is transporting items within the fulfillment center 220, preparing such items for delivery to a customer, or delivering the items to the customer, the worker 240 may operate one or more handheld devices 250, which may be a device that is specifically programmed or adapted for such purposes, or a general purpose device such a personal digital assistant, a digital media player, a smartphone, a tablet computer or a laptop computer, as well as a wearable computer device such as a pair of augmented reality glasses or a wristwatch, and may include any form of input and/or output peripherals such as scanners, readers, keyboards, keypads, touchscreens or pointing devices. For example, the worker 240 may confirm his or her retrieval of an item using the handheld device 250, as well as his or her placement of the item onto the truck 230, his or her delivery of the item to a destination using the truck 230, his or her arrival at the destination with the item, his or her retrieval of the item from the truck 230, and a completed delivery of the item to the destination at any time using the handheld device 250.

As is shown in FIG. 2B, the handheld device 250 may include or comprise one or more hardware components or software applications for performing one or more of the functions disclosed herein. For example, the handheld device 250 may include one or more computer processors 252, as well as a variety of sensors including a cellular telephone transceiver 254, a GPS receiver or sensor 255, an accelerometer 256, a gyroscope 257 or a compass 258. The cellular telephone transceiver 254 may be utilized to transmit or receive cellular telephone signals to or from a cellular telephone network source (not shown) in the form of audio communications, network communications packets, SMS or MMS text messages or any other form of data that may be transmitted by or through such means. The GPS receiver or sensor 255 may be adapted to receive signals (e.g., trilateration data or information) relating to a position of the handheld device 250 from one or more GPS satellites of a GPS network. The accelerometer 256 may be adapted to detect or measure accelerations of the handheld device 250 in one or more translational or rotational dimensions or directions. The gyroscope 257 may be adapted to determine an angular orientation or velocity of the handheld device 250 based on principles of angular momentum. The compass 258 may be adapted to determine one or more directions with respect to a frame of reference that is fixed with respect to the surface of the Earth (e.g., a pole thereof). Additionally, the handheld device 250 may further include any other sensors or components for determining positions, velocities, accelerations or orientations of the handheld device 250.

The handheld device 250 may be further configured to capture, record and/or analyze information or data regarding the positions, velocities, accelerations or orientations of the handheld device 250, and to analyze such data or information by one or more means, e.g., by aggregating or summing such data or information to form one or more qualitative or quantitative metrics of the movement of the handheld device 250. For example, a net vector indicative of any and all relevant movements of the handheld device 250, including but not limited to physical positions, velocities, accelerations or orientations of the handheld device 250, may be derived. Additionally, coefficients or scalars indicative of the relative movements of the handheld device 250 (e.g., a position, a typing speed or an angular orientation), or activity of the worker 240 (e.g., driving, walking, running on any surface features) may also be defined.

The customer 260 may be any entity or individual that wishes to download, purchase, rent, lease, borrow or otherwise obtain items (which may include goods, products, services or information of any type or form) from the marketplace 210. The customer 260 may utilize one or more computing devices, such as a smartphone 262 or any other like machine that may operate or access one or more software applications, such as a web browser (not shown) or a shopping application 264, and may be connected to or otherwise communicate with the marketplace 210, the fulfillment center 220, the truck 230 or the worker 240 through the network 270, as indicated by line 268, by the transmission and receipt of digital data. Moreover, the customer 260 may also receive deliveries or shipments of one or items from facilities maintained by or on behalf of the marketplace 210, such as the fulfillment center 220, by way of the truck 230 or other transportation means (e.g., cars, trailers, freight cars, container ships or cargo aircraft, including manned aircraft or unmanned aircraft, such as drones).

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center," a "worker" or a "customer," or like terms, may be automated steps performed by their respective computer systems, or implemented within software modules (or computer programs) executed by one or more general purpose computers. Moreover, process steps described as being performed by a "marketplace," a "fulfillment center," a "worker" or a "customer" may be typically performed by a human operator, but could, alternatively, be performed by an automated agent.

The marketplace 210, the fulfillment center 220, the truck 230, the worker 240 and/or the customer 260 may use any web-enabled or Internet applications or features, or any other client-server applications or features including electronic mail (or E-mail), or other messaging techniques, to connect to the network 270 or to communicate with one another, such as through short or multimedia messaging service (SMS or MMS) text messages. For example, the fulfillment center 220 and/or the desktop computer 222 may be adapted to transmit information or data in the form of synchronous or asynchronous messages to the server 212, the handheld device 250, the smartphone 262 or any other computer device in real time or in near-real time, or in one or more offline processes, via the network 270. Those of ordinary skill in the pertinent art would recognize that the marketplace 210, the fulfillment center 220, the truck 230, the worker 240 or the customer 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the desktop computer 222, the handheld device 250 or the smartphone 262, or any other computers or control systems utilized by the marketplace 210, the fulfillment center 220, the truck 230, the worker 240 or the customer 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
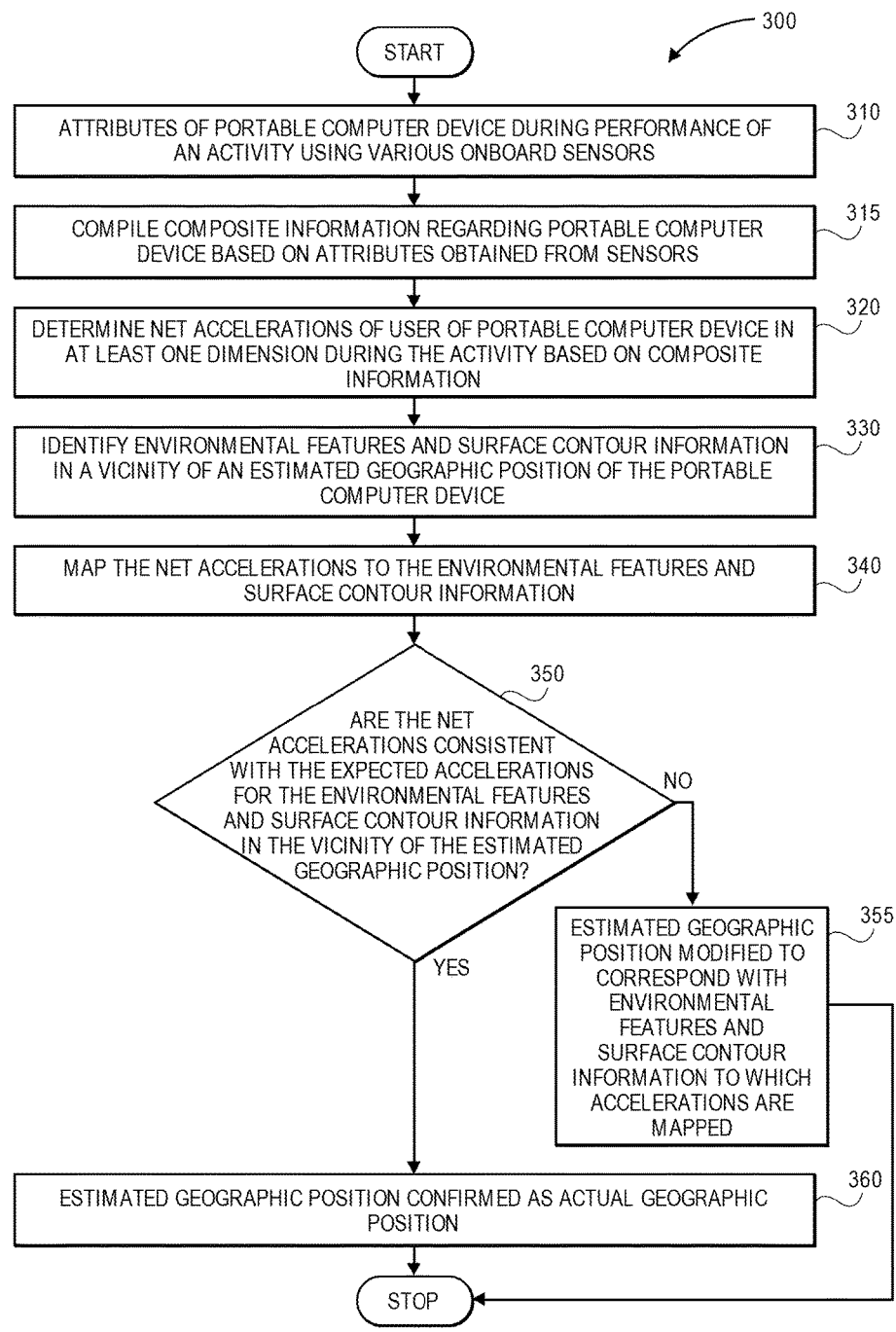
FIG. 3 is a flow chart of one process for enhancing geocoding accuracy in accordance with embodiments of the present disclosure.

As is discussed above, the systems and methods of the present disclosure are directed to enhancing the accuracy of geocoding, viz., or identifying associated geographic coordinates or other location information from other geographic data, or any other estimation of a location or position, through the use of accelerometers and other sensors. Specifically, information regarding a position of a mobile computer device that is obtained from a location provider associated with the mobile computer device having a degree or level of error or tolerance may be augmented with acceleration information or data obtained from one or more sensors with regard to one or multiple orthogonal axes, and the information or data may be mapped against one or more surface features (such as pathways, stairways, hills, ramps, escalators or other features having corresponding variations in elevation and position) in a vicinity of the mobile computer device in order to narrow the error or tolerance associated with the information regarding the position. Referring to FIG. 3, a flow chart 300 representing one embodiment of a process for enhancing geocoding accuracy in accordance with embodiments of the present disclosure is shown.

At box 310, attributes of a portable computer device are monitored during the performance of an activity using one or more various onboard sensors. For example, where the worker 110 of FIG. 1 carries a handheld device 112 and a parcel 114 from the delivery vehicle 120 to the destination 130, the handheld device 112 may estimate a geographic position during a period of time period extending from time $t_0$ to time $t_9$ using a GPS sensor, determine an acceleration or a velocity using an accelerometer, or determine an angular orientation using a gyroscope. Alternatively, an estimated position may be identified by any number of other means. For example, an estimated position may be an expected position of the handheld device 112 defined based on an anticipated street address or other location associated with the destination 130. At box 315, composite information regarding the portable computer device is compiled based on the attributes obtained from the various sensors. For example, information or data regarding a position, an acceleration, a velocity or an orientation of the portable computer device may be aggregated according to one or more sensor fusion algorithms or techniques.

At box 320, net accelerations of a user of the portable computer device are determined in at least one dimension during the activity based on the composite information. For example, where a portable computer device includes an on-board accelerometer, gyroscope or compass, e.g., the accelerometer 256, the gyroscope 257 or the compass 258 of the portable device 250 of FIG. 2, the portable computer device may detect and track accelerations, velocities or positions in x-, y- or z-directions, or along x-, y- or z-axes, during the performance of the activity over time, and derive net acceleration data regarding the user according to one or more functions or algorithms. Such functions may filter or process the information obtained one or more of the sensors in order to remove any noise, errors or variations expressed in the composite information, or to filter out the effects of gravity, and thereby derive net accelerations for the user.

At box 330, information regarding environmental features and surface contours in a vicinity of an estimated geographic position of the portable computer device is identified. In this regard, a database or other record of topographical or digital terrain data that includes information regarding elevations of various surface features in a vicinity of the portable computer device may be identified and accessed. At box 340, the net accelerations determined at box 320 may be mapped to the environmental features and surface contour information in the vicinity of the estimated geographic position of the portable computer device. Where such environmental features or surface contours indicate varying changes of elevation or position in the area of the estimated geographic position of the handheld device, the net accelerations determined at box 320 may be compared to such information in order to determine whether the net accelerations are consistent with the features or contours.

For example, according to one embodiment, where the net accelerations determined at box 320 indicate a substantially constant sinusoidal pattern of vertical accelerations consistent with a walking gait and no net change in vertical velocity (e.g., in a y-direction), the portable computer device may be deemed to be traveling on a substantially flat surface. Where the accelerations indicate a net increase in vertical velocity, however, the portable computer device may be deemed to have changed its direction or speed in an upward direction, such as by proceeding from a substantially flat surface into an upwardly sloped or upwardly configured surface, e.g., a ramp or set of stairs. Where the accelerations indicate a net increase or decrease in horizontal velocities, the portable computer device may be deemed to have changed its direction or speed in a horizontal direction (e.g., in an x-direction or a z-direction).

At box 350, the portable computer device determines whether the net accelerations are consistent with the expected accelerations for the environmental features and surface contour information in the vicinity of the estimated geographic position. For example, if the estimated geographic position indicates that a ramp or set of stairs is nearby, and the net accelerations mapped at box 340 are consistent with travel upon a ramp or set of stairs, then the mapped accelerations are deemed to be consistent with the estimated geographic position, and the process advances to box 360, where the estimated geographic position is confirmed as the actual geographic position. A comparison of observed net accelerations to expected accelerations may consider any relevant extrinsic or intrinsic information or data, alone or in combination. For example, where net accelerations imply both a set number of steps (e.g., a sinusoidal pattern having a fixed number of peaks) and also a net change in elevation or a net distance traveled, the combination of such information may uniquely identify a location in a manner that the number of steps, the net change in elevation or the net distance traveled alone would not. Conversely, if the estimated geographic position indicates a ramp or set of stairs, and the mapped accelerations are deemed to be consistent with travel upon a substantially flat surface, then the mapped accelerations are deemed to be inconsistent with the estimated geographic position. Thus, the process advances to box 355, where the estimated geographic position is modified to correspond with the surface contour information to which the accelerations are mapped, and the process ends.

Accordingly, as is set forth above, the systems and methods of the present disclosure may be used to determine confirm a location of a mobile computer device, or to narrow an area of uncertainty associated with such a position, by comparing observed accelerations to known surface features in a vicinity, mapping the observed accelerations to the known surface features, and correlating the location with the mapped accelerations. Moreover, where a sufficiently large set of data regarding motion of a mobile computer device and detailed information regarding an environment or surface contours in which such motion was observed are available, a sufficiently precise geocode or other relevant positioning information may be derived even where a geolocator or location provider such as a GPS sensor or a network triangulation module is unavailable (e.g., indoors or underground).

Figure 4A:
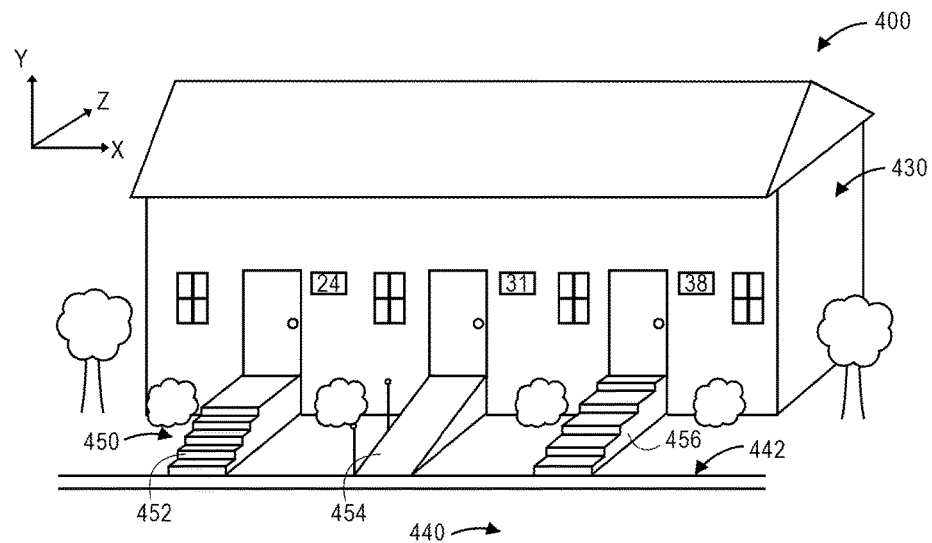
FIGS. 4A and 4B are views of one system for enhancing geocoding accuracy in accordance with embodiments of the present disclosure.

One example of an application in which the systems and methods of the present disclosure, such as the process embodied in the flow chart 300 of FIG. 3, may be used to enhance the accuracy of geocoding techniques is shown with regard to FIGS. 4A-4E. Referring to FIG. 4A, a system 400 includes a destination 430 (viz., a multi-family dwelling) having a plurality of entry points 432, 434, 436 within a close proximity of one another. The destination 430 may be accessed by way of surface features 440, 442, e.g., a street and a curb, respectively. Further, the entry points 432, 434, 436 of the destination 430 may be accessed by way of a plurality of surface features 450, such as a set of stairs and walkway 452, a handicapped ramp 454 and an extended set of stairs 456.

Figure 4B:
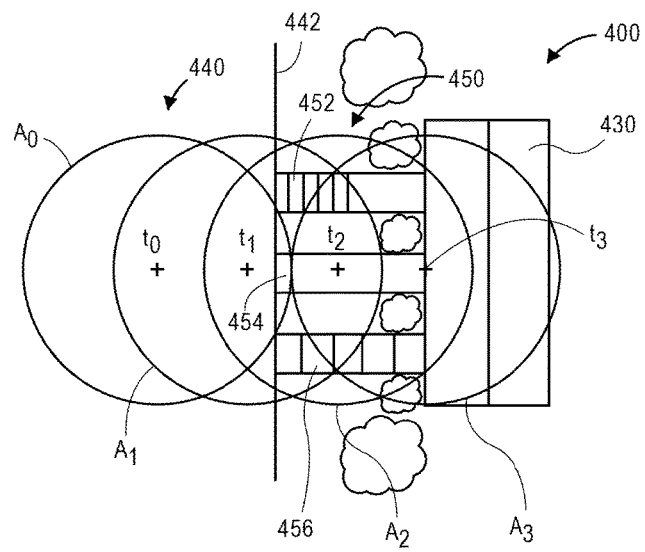

As is discussed above, positions of mobile computer devices that are determined using location providers such as GPS sensors or network triangulations are typically accurate to within a defined level of error or tolerance. Referring to FIG. 4B, a top view of the system 400 of FIG. 4A is shown, with areas of uncertainty $A_0$, $A_1$, $A_2$, $A_3$ corresponding to travel of a mobile computing device at times $t_0$, $t_1$, $t_2$ and $t_3$, respectively. As is shown in FIG. 4B, while the areas of uncertainty $A_0$, $A_1$, $A_2$, $A_3$ demonstrate that the mobile computer device traveled to the destination between time $t_0$ and time $t_3$, each of the entry points 432, 434, 436 falls within the area of uncertainty $A_3$ at time $t_3$. Therefore, using position information determined by a GPS sensor or triangulated network signals alone, it is difficult to determine to which of the entry points 432, 434, 436 the mobile computer device traveled.

Figure 4C:
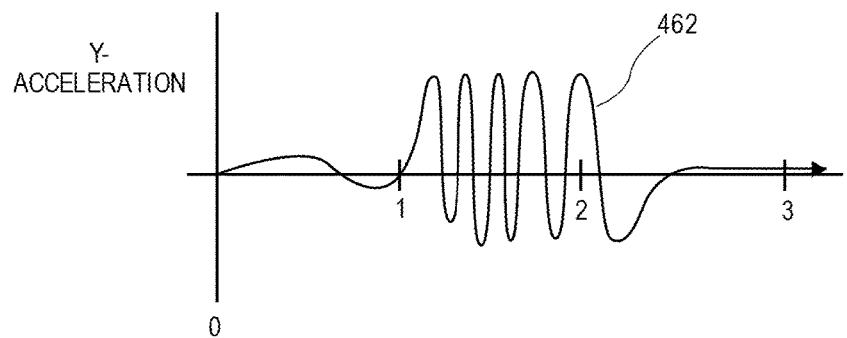
FIGS. 4C, 4D and 4E are views of data associated with the system of FIGS. 4A and 4B, in accordance with embodiments of the present disclosure.

As is also discussed above, the systems and methods of the present disclosure may enhance the accuracy of positions estimated using standard location providers (e.g., GPS or network triangulations) or by any other means (e.g., an expected or predicted location, such as an anticipated street address where a mobile computer device is believed to be located) by determining accelerations experienced by a mobile computer device, and mapping such accelerations to known surface features in a vicinity of the estimated positions. In this regard, the accuracy of a position, such as the areas of uncertainty $A_0$, $A_1$, $A_2$, $A_3$ of FIG. 4B, may be narrowed based on the mapped accelerations. For example, referring to FIG. 4C, a plot 462 of net vertical acceleration (viz., in a y-direction) over time is shown from time $t_0$ to time $t_3$. As is shown in FIG. 4C, between time $t_0$ and time $t_1$, the plot 462 indicates a sinusoidal pattern of net vertical accelerations that is consistent with a walking gait along the surface feature 440 (viz., a street). Between time $t_1$ and time $t_2$, however, the plot 462 indicates a more sharply varying sinusoidal pattern indicative of a net increase in vertical velocity (i.e., upward in the y-direction). Thus, the plot 462 is consistent with the surface feature 452, which comprises a set of stairs followed by a walkway leading to the point of entry 432. Where net vertical accelerations of a mobile computer device that are consistent with the plot 462 are observed, the mobile computer device may be presumed to be traveling upon the surface feature 452 between the surface feature 440 and the point of entry 432.

Figure 4D:
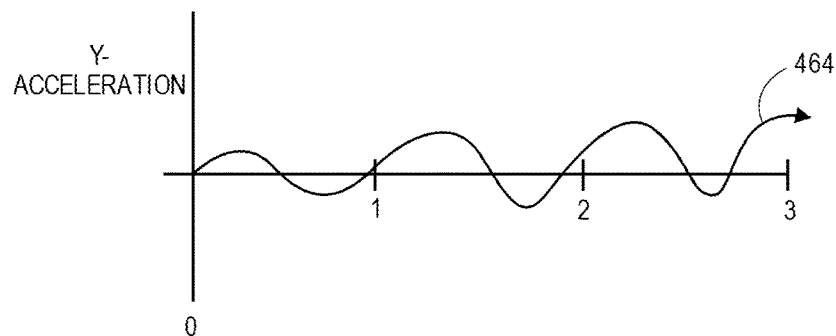
Figure 4E:
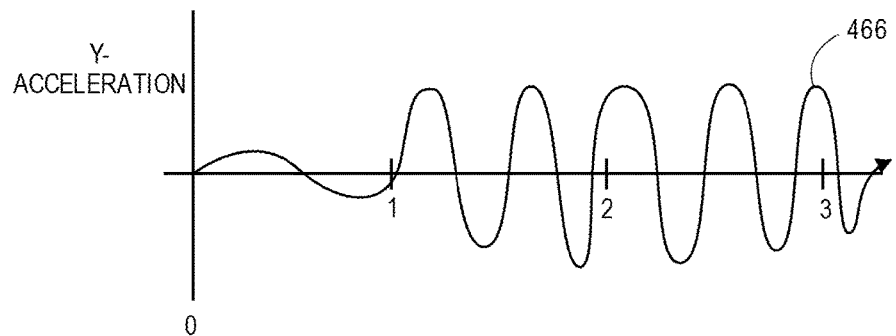

Similarly, referring to FIG. 4D, a plot 464 of net vertical acceleration over time is shown from time $t_0$ to time $t_3$. Between time $t_0$ and time $t_3$, the plot 464 indicates a sinusoidal pattern with slightly increasing net vertical accelerations consistent with a smooth net increase in vertical velocity between time $t_0$ and time $t_3$. Thus, the plot 464 is consistent with the surface feature 454, which comprises a handicapped ramp leading to the point of entry 432. Therefore, where net vertical accelerations of a mobile computer device that are consistent with the plot 464 are observed, the mobile computer device may be presumed to be traveling upon the surface feature 454 between the surface feature 440 and the point of entry 434. Likewise, referring to FIG. 4E, a plot 466 of net vertical acceleration over time is shown from time $t_0$ to time $t_3$. Between time $t_0$ and time $t_1$, the plot 466 indicates a sinusoidal pattern of net vertical accelerations that are consistent with a walking gait along the surface feature 440 (viz., a street). Between time $t_1$ and time $t_3$, however, the plot 466 indicates an increase in the varying sinusoidal pattern of net vertical accelerations indicative of a net increase in vertical velocity (i.e., upward in the y-direction), but to a less frantic degree than the plot 462 of FIG. 4C between time $t_1$ and time $t_2$, however. Thus, the plot 466 is consistent with the surface feature 456, which comprises an extended set of stairs 456.

Accordingly, the systems and methods of the present disclosure may enhance the accuracy of positions of mobile computer devices determined using standard location providers by determining net accelerations associated with such devices and mapping such accelerations against real-world constraints within a vicinity of such positions. By mapping net accelerations to real-world constraints, a more precise position within an area of uncertainty may be determined, such as by identifying which of the surface features 452, 454, 456 shown in FIG. 4A and FIG. 4B corresponds to the travel of the mobile computer device between time $t_0$ and time $t_3$ based on the accelerations.

Figure 5:
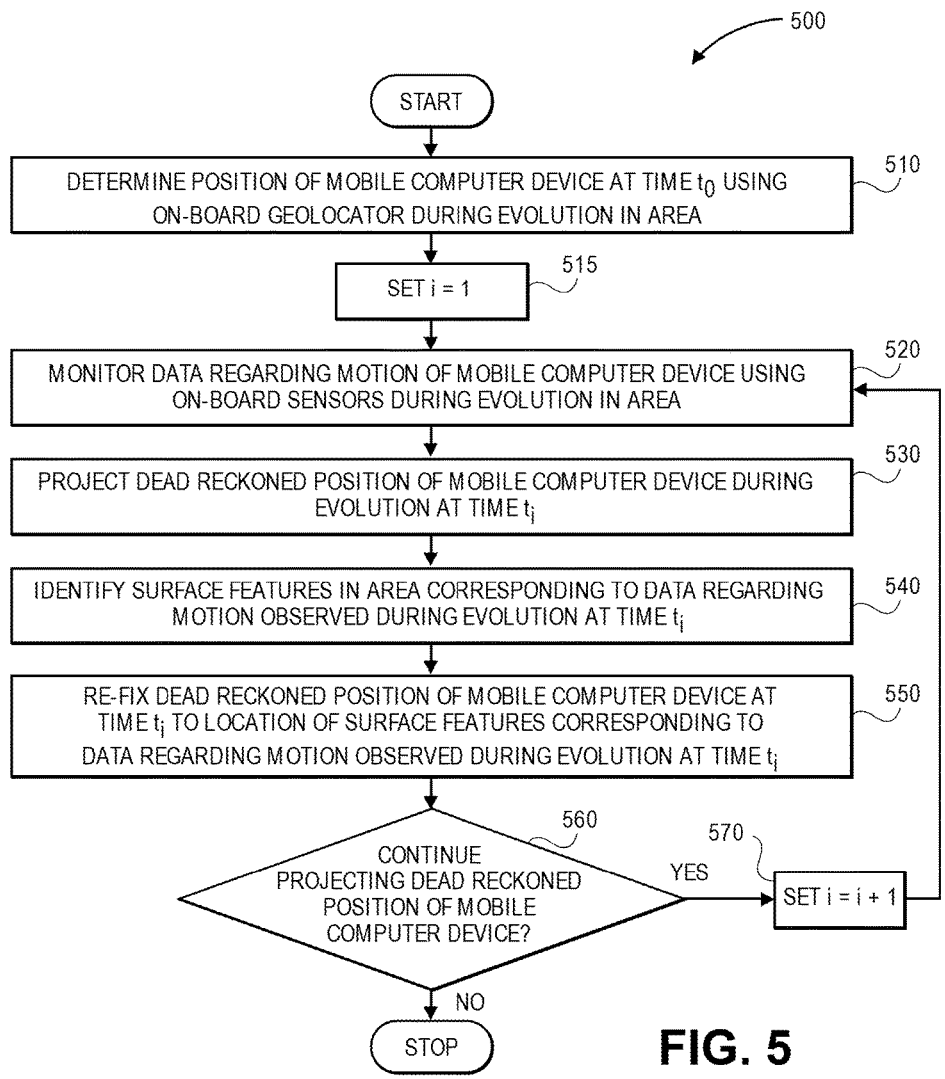
FIG. 5 is a flow chart of one process for enhancing geocoding accuracy in accordance with embodiments of the present disclosure.

As is also discussed above, the systems and methods of the present disclosure may improve the accuracy of dead reckoned positions determined based on locations obtained from GPS sensors, triangulations of network signals or other location providers, either on a one-time or iterative basis. Referring to FIG. 5, a flow chart 500 representing one embodiment of a process for enhancing geocoding accuracy in accordance with embodiments of the present disclosure is shown. At box 510, a position of a mobile computer device is determined at time $t_0$ using an on-board geolocator having a known level of accuracy. For example, where a smartphone or other mobile device includes a GPS sensor which provides position information that is deemed accurate to within two to ten meters (2-10 m), an estimated position may be obtained from the smartphone, and an area of uncertainty associated with the position may be determined based on the level of accuracy.

At box 525, a value of a loop iterator variable i is set at 1, and at box 520, data regarding motion of the mobile computer device may be monitored using on-board sensors during the performance of an evolution in an area. For example, a smartphone's accelerometer may determine variations in acceleration in x-, y- or z-directions or along x-, y- or z-axes as a user of the smartphone performs one or more tasks in a specific area, while the smartphone's gyroscope may determine the orientations of the accelerometer about the x-, y- or z-axes, and the compass may determine a direction associated with motions executed during the performance of the tasks. At box 530, a dead reckoned position of the mobile computer device during the performance of the evolution is projected at time $t_1$. For example, where a position and a velocity of the mobile computer device are able to be estimated, the dead reckoned position of the mobile computer device may be projected to within a certain degree of accuracy or tolerance according to one or more dead reckoning systems. The dead reckoned position may be determined in a probabilistic manner, taking into account one or more possible positions, and selecting a most appropriate or most probable position on any relevant bases.

At box 540, surface features in an area corresponding to the data regarding the motion that were observed during the performance of the evolution at time $t_i$ are identified. For example, any hills, slopes, ramps, structures or other natural terrain or artificial features in a vicinity of the accelerations may be located using one or more sets of data or information such as photographs, charts or tables including topographical data, and compared to the accelerations observed at time $t_i$. At box 550, a "re-fix" of the dead reckoned position of the mobile computer device is determined according to the surface features corresponding with the data regarding the motion of the mobile computer device that was observed at time $t_i$. For example, the dead reckoned position may be relocated, or the area of uncertainty narrowed, where net accelerations observed may be correlated with one or more surface features, thereby confirming a specific location of the mobile computer device based on such net accelerations.

If the surface features correspond to the dead reckoned position, or after repositioning the dead reckoned position based on the surface features, the process advances to box 560, where a user may be prompted to indicate whether the projection of a dead reckoned position of the mobile computer device is to be continued. If the projections are to continue, then the process advances to box 570, where the value of a loop iterator variable i is incrementally advanced by 1, before returning to box 520, where data regarding the motion of the mobile computer device is monitored using on-board sensors during the performance of an evolution in the area at time $t_1$. If further projections are no longer desired, the process ends.

Figure 6A:
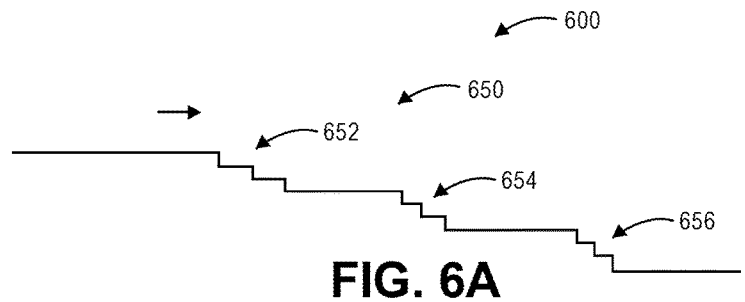
FIGS. 6A, 6B, 6C and 6D are views of one system for enhancing geocoding accuracy in accordance with embodiments of the present disclosure.
Figure 6B:
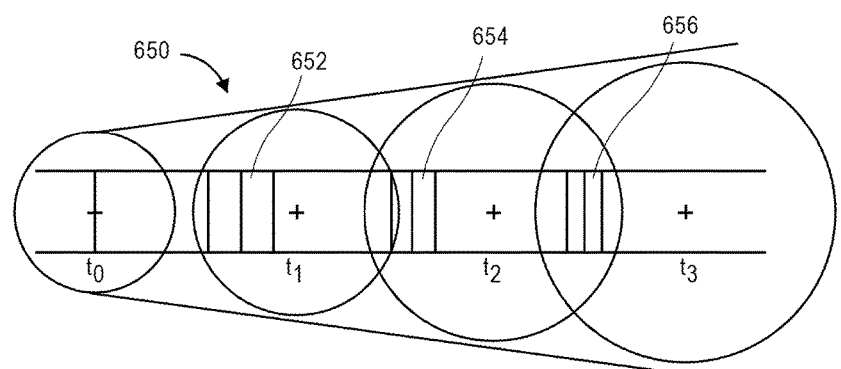
Figure 6C:
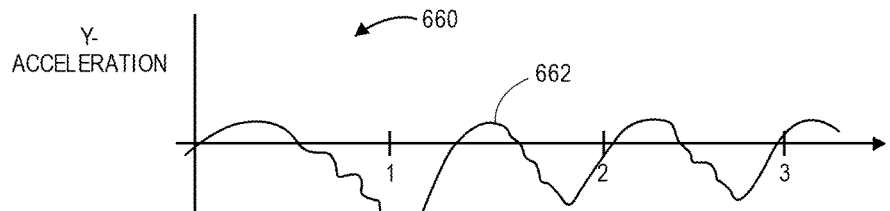

Referring to FIGS. 6A through 6D, one example of the use of the systems and methods disclosed herein to enhance the accuracy of dead reckoned positions is shown. FIG. 6A shows a path of travel along a series of surface features 650, including sets of stairs 652, 654, 656, 658. Referring to FIG. 6B, a dead reckoned position of the mobile computer device is shown from time $t_0$ through time $t_3$, with an expanding area of uncertainty corresponding to each successively dead reckoned position. The dead reckoned positions shown in FIG. 6B begin with a fix at time $t_0$, as shown by an area of uncertainty in the form of a circle having a first diameter, followed by areas of uncertainty shown as circles having increasingly larger diameters at times $t_1$, $t_2$ and $t_3$. Referring to FIG. 6C, a graph 660 of the net y-accelerations 662 as a user of the mobile computer device travels along the series of surface features 650, including the sets of stairs 652, 654, 656, 658. For example, the graph 660 shows net y-accelerations that indicate a series of slight positive values followed by cascading negative values over time, as the user bounds down each of the sets of stairs 652, 654, 656, 658 before returning to an approximately zero value.

Figure 6D:
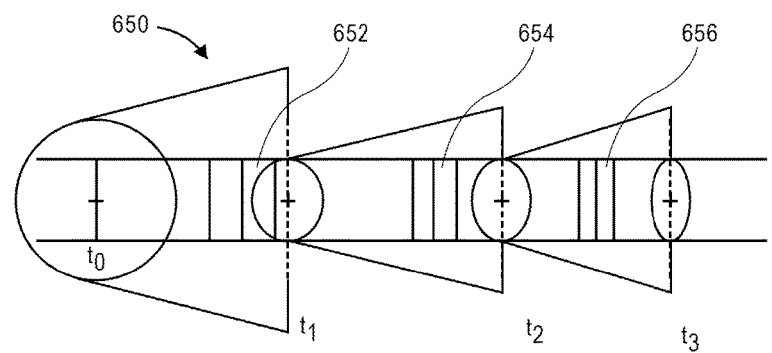

As is discussed above, the systems and methods of the present disclosure may enhance the accuracy of a dead reckoned position by identifying any available information or data regarding net accelerations of a mobile computer device, or a user of the mobile computer device, in a vicinity of one or more environmental features or surface contours in a vicinity of the computer device. Where the net accelerations may be associated with one or more of the features or contours, an area of uncertainty associated with a dead reckoned position may be reduced by correlating the dead reckoned position with one or more of the respective features or contours. Referring to FIG. 6D, the areas of uncertainty associated with the fix at time $t_0$ and the dead reckoned positions obtained from time $t_1$ through time $t_3$ are shown.

As is shown in FIG. 6D, the dead reckoned positions obtained from time $t_1$ through time $t_3$ are shown as having been reduced based on correlations between the net acceleration data of FIG. 6C and the surface features 650, viz., the sets of stairs 652, 654, 656, 658. Because the net accelerations 662 may be correlated with the sets of stairs 652, 654, 656, 658, the area of uncertainty associated with a dead reckoned position may be narrowed, as the mobile computer device may be determined to be on such stairs 652, 654, 656, 658 during the points in time corresponding to such net accelerations 662. For example, at time $t_1$, the area of uncertainty may be narrowed to a width of the set of stairs 652, at least because the net accelerations 662 may be expressly correlated to the changes in elevation associated with the stairs 652, thereby confirming that the mobile computer device traveled somewhere within the width of the set of stairs 652 along an axis of travel at that time. Similarly, the areas of uncertainty at times $t_2$ and $t_3$ may be further narrowed to cover the widths of the stairs 654, 656, as the mobile computer device must have traveled somewhere within such widths along the axis of travel at such times.

Moreover, the systems and methods of the present disclosure may be further utilized to construct virtual maps of surfaces of regions based at least in part on mapped net acceleration data. For example, where a mobile computer device having a variety of on-board sensors such as accelerometers, gyroscopes or compasses observes net accelerations that are consistent with travel over flat surfaces for distances or periods of time, the mobile computer device may provide information regarding such accelerations and/or any other relevant intrinsic or extrinsic data to an identification engine or module that may project one or more surface features in a vicinity of the mobile computer device. For example, a surface feature identification engine may utilize such net accelerations, and any other relevant intrinsic or extrinsic data, to generate a map or graph indicative of the flat surfaces over the distances or for the periods of time according to one or more machine learning techniques. According to some embodiments, the surface features represented in the map or graph may be correlated with an area of uncertainty of a position obtained from a location provider (e.g., a GPS sensor) of the mobile computer device. Similarly, where the mobile computer device observes accelerations that are consistent with travel over sloped surfaces (e.g., travel up or down ramps) or stepped surfaces (e.g., up or down stairs), or across other surface features including not only natural terrain but also artificial features for predetermined distances or times, the identification engine may generate a map indicative of such surface features over such distances or times, which may be correlated with one or more areas of uncertainty of positions obtained from a location provider.

Figure 7:
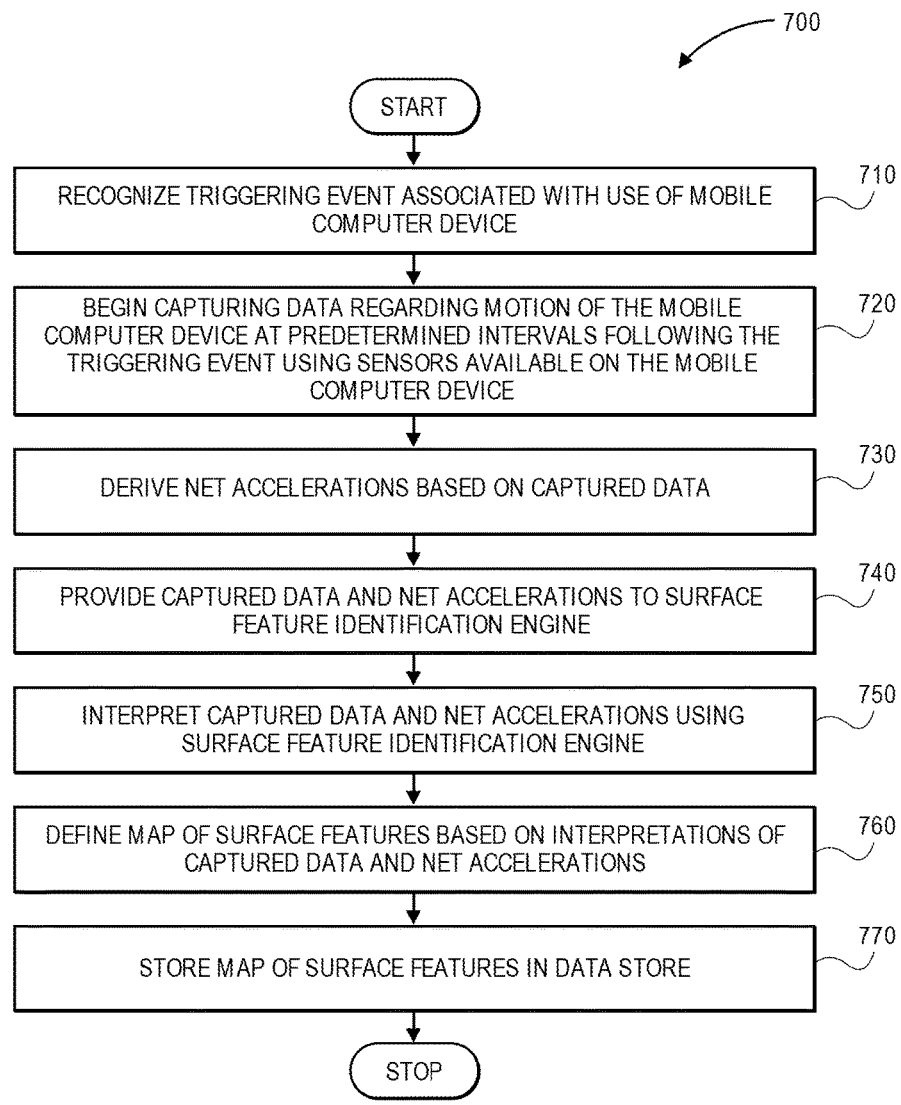
FIG. 7 is a flow chart of one process for enhancing geocoding accuracy in accordance with embodiments of the present disclosure.

Referring to FIG. 7, a flow chart 700 representing one embodiment of a process for enhancing geocoding accuracy in accordance with embodiments of the present disclosure is shown. At box 710, a triggering event associated with the use of a mobile computer device is recognized. The triggering event may be any event relating to the operation of a mobile computer device, such as turning the device on, or initiating one or more applications from the device. Additionally, the triggering event may be associated with one or more sensed actions or events associated with the motion of the device. For example, a user holding or operating the mobile computer device may step down from a truck or take one or more other recognizable actions that may be sensed by the mobile computer device. At box 720, in response to the triggering event, data regarding motion of the mobile computer device is sensed at regular, predetermined intervals following the triggering event using one or more sensors that are available on the mobile computer device. For example, once the triggering event has been recognized, the mobile computer device may monitor information regarding accelerations, velocities or orientations of the mobile computer device at nominal intervals of one second, or fractions of one second, or at any other intervals, using any available accelerometers, gyroscopes, compasses or like components.

At box 730, net accelerations of the mobile computer device may be defined based on the captured data, which may be combined or aggregated according to one or more sensor fusion algorithms or according to any relevant technique. For example, referring again to FIG. 1, one or more functions representative of the accelerations in the x-, y- and z-directions shown in the plots 162, 164, 166, respectively, may be derived in any form, e.g., linear, polynomial or quadratic. At box 740, the captured data and the net accelerations may be provided to a surface feature identification engine, which may be configured to receive and process the captured data and the net accelerations, along with any other intrinsic or extrinsic data according to one or more mathematical or statistical techniques. For example, because acceleration may be defined as the derivative of velocity, or $a(t)=dv(t)/dt$, a velocity function may be derived by integrating the acceleration function, or $v(t)=\int a(t)dt$. Moreover, the velocity function may be derived in a single dimension, or in multiple dimensions, e.g., along one or more of the x-, y- and z-axes. Likewise, a position function for the mobile computer device may be derived by integrating the velocity function in a single dimension or in multiple dimensions. Information regarding the velocities and the positions may be used to determine whether, for example, a user of the computer device has begun to ascend stairs, is traveling on an escalator, or is riding a bicycle down a ramp.

At box 750, the captured data and the net accelerations may be interpreted using the surface feature identification engine. For example, the captured data may be processed to filter out any noise or to account for any drift associated with one or more sensors from which the data was captured, or to remove the effects of gravity therefrom, and to recognize one or more characteristics therefrom. At box 760, a map of surface features is defined based on the interpretations of the captured data and the net accelerations. For example, the accelerations, velocities or orientations of the mobile computer device at given times may be interpreted based on the net accelerations or captured data, and the motion of the device may be defined by line segments, planar segments or any other positional representations of features of the surfaces upon which a user of the mobile computer device traveled at such times. Such features may indicate flat surfaces or sloped surfaces, as well as one or more discontinuities (e.g., stairs, cliffs, breaks or gaps) of such surfaces.

At box 770, the map of the surface features may be stored in at least one data store, and may be used for any suitable purpose. For example, the map may act as a forensic record of the travels of a user of the mobile computer device at the time of its derivation or, alternatively, may be used as a guide for future travels of users of the mobile computer device, or of other mobile computer devices.

The generation of a map or a graph of surface features in accordance with the present disclosure may be shown in FIGS. 8A through 8E, from which the existence of one or more surface features (e.g., stairs, ramps or obstacles) is inferred based at least in part on a manner in which a user of a mobile computer device travels along such features. Referring to FIGS. 8A through 8E, a worker 810 who is using a mobile computer device 812 and carrying a parcel 814 is shown as traveling along a plurality of surface features 850, including a set of stairs 852 and a curved and sloped walkway 854, from time $t_0$ to time $t_8$. The worker 810 begins his travels by turning up the set of stairs 852 from time $t_0$ to time $t_3$, before turning to his right at time $t_4$ and traveling along the walkway 854 from time $t_5$ to $t_8$.

Figure 8A:
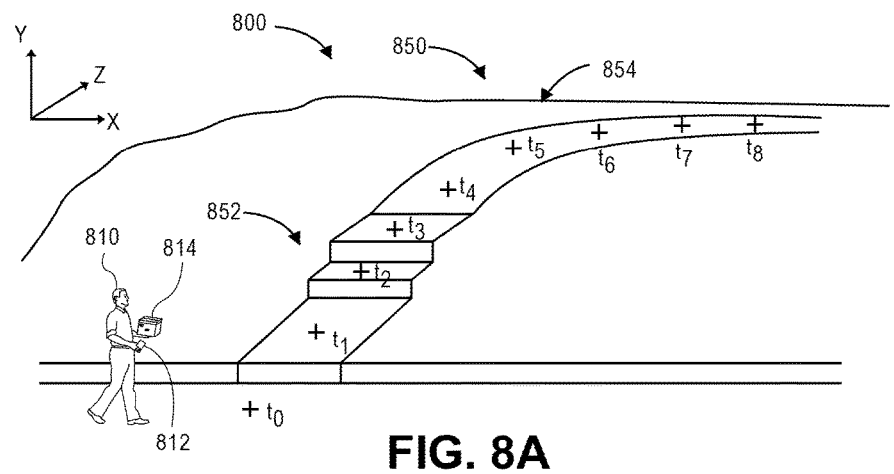
FIGS. 8A, 8B, 8C, 8D and 8E are views of one system for enhancing geocoding accuracy in accordance with embodiments of the present disclosure.
Figure 8B:
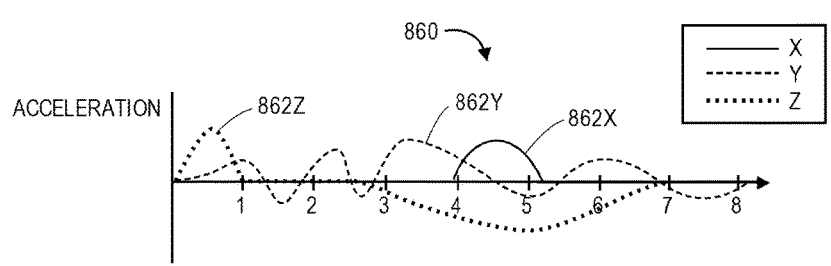

Referring to FIG. 8B, a plot 860 of the net accelerations 862X, 862Y, 862Z observed from the mobile computer device 812 in the x-, y- and z-directions, respectively, is shown. As is shown in FIG. 8B, the net x-acceleration 862X is substantially zero between time $t_0$ and approximately time $t_4$, at which time the net x-acceleration momentarily increased as the worker 810 pivoted and turned to the right, and returned to substantially zero from time approximately time $t_5$ through time $t_8$. As is also shown in FIG. 8B, the net y-acceleration 862Y alternates in a sinusoidal pattern consistent with a walking gait with a slight net change in vertical velocity as the worker 810 bounds up the set of stairs 852 from time $t_0$ through approximately time $t_3$, before turning to his right at time $t_4$ and returning to a substantially constant sinusoidal pattern consistent with a walking gait on the walkway 854 at approximately time $t_5$, with no net change in vertical velocity. As is further shown in FIG. 8B, the net z-acceleration 862Z initially increases between time $t_0$ and time $t_1$, as the worker 810 turns up the set of stairs 852 in the z-direction before decreasing between time $t_3$ and time $t_7$, as the worker 810 turns to his right and walks along the walkway 854.

Figure 8C:
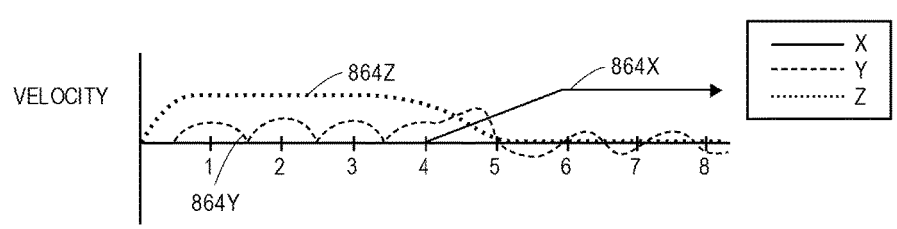
Figure 8D:
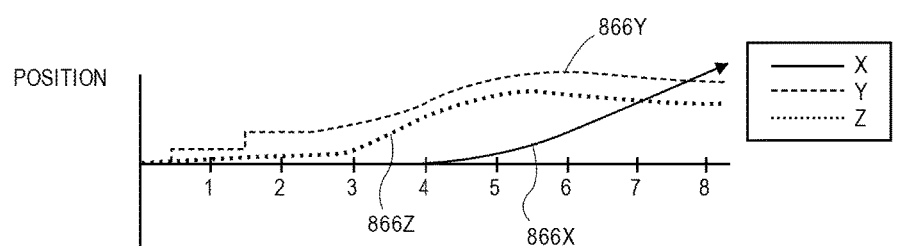

Referring to FIGS. 8C and 8D, plots of the net velocities and net positions of the mobile computer device 812 derived based on the net accelerations 862X, 862Y, 862Z shown in FIG. 8B are shown. As is shown in FIG. 8C, the net x-velocity 864X of the mobile computer device 812 is substantially zero from time $t_0$ to time $t_4$, as the worker 810 travels in the y-direction and z-direction up the set of stairs 852, but increases to a substantially constant level at time $t_5$ as the worker 810 turns to his right along the walkway 854. Likewise, the net y-velocity 864Y of the mobile computer device 812 is shown as having positive values consistent with walking up the set of stairs 852 and along the walkway 854 from time $t_0$ to time $t_5$, and a substantially zero value from time $t_5$ to time $t_8$, as the worker 810 remains at a substantially level elevation along flat portions of the walkway 854 between such times. The net z-velocity 864Z of the mobile computer device 812 is shown as having a substantially constant positive value from time $t_0$ through time $t_5$, until the worker 810 has turned down the walkway 854, and his position no longer changes in the z-direction, i.e., the net z-velocity is substantially zero.

As is shown in FIG. 8D, the net x-position of the mobile computer device 812 is substantially zero from time $t_0$ to time $t_3$, as the worker 810 travels in the y-direction and z-direction up the set of stairs 852, but begins to increase at time $t_3$ as the worker 810 turns to his right and travels along the walkway 854 in the x-direction. The net y-position of the mobile computer device 812 is shown as an increasing step function from time $t_0$ to time $t_3$, as the worker 810 walks up the set of stairs 852, before increasing at a substantially linear rate between time $t_3$ and time $t_4$ as the worker 810 begins to walk along the walkway 854 in the x-direction, and remains substantially constant beginning at time $t_5$ as the worker 810 reaches a crest on the walkway 854. The net z-position of the mobile computer device is shown as increasing substantially linearly from time $t_0$ through time $t_5$, as the worker walks up the set of stairs 852 in the z-direction and the walkway 854, but remains substantially constant from time $t_5$ through time $t_8$, after the worker 810 has completed his turn to the right and his position no longer changes in the z-direction.

Figure 8E:
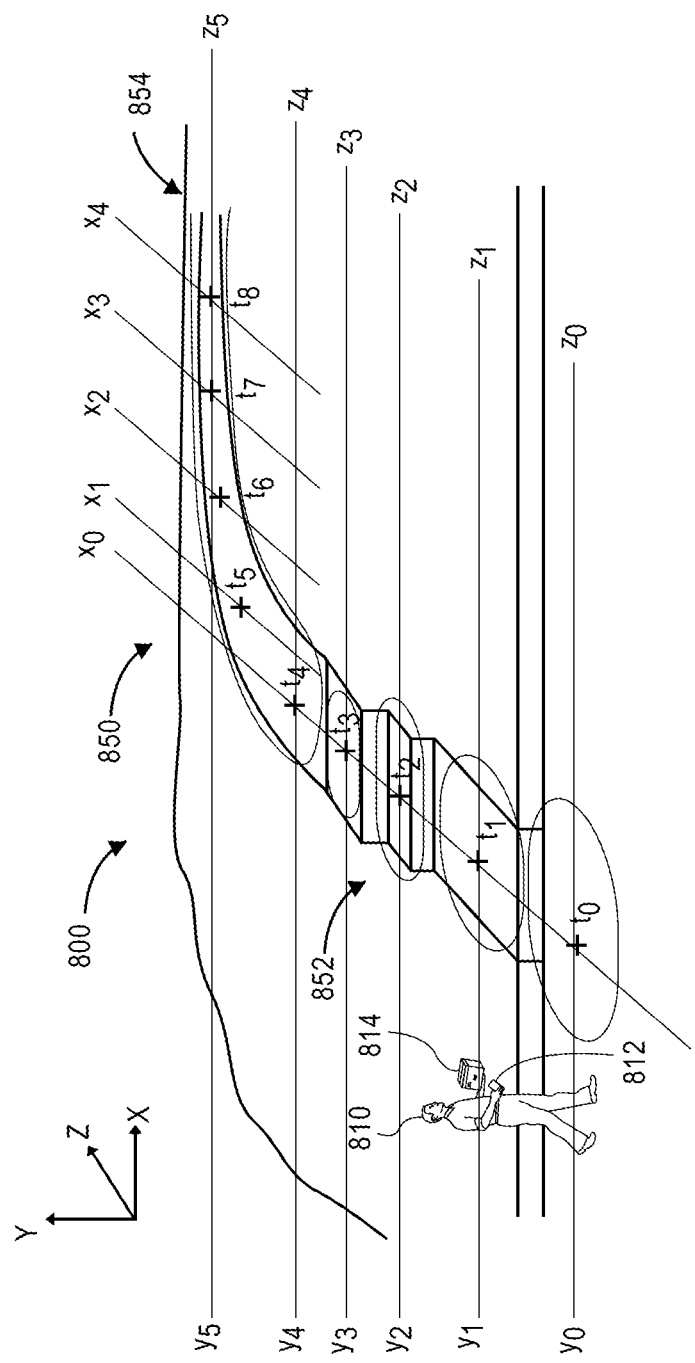

Referring to FIG. 8E, a map of the surface features as generated based on the accelerations captured by the mobile computer device is shown. The map shows the travels of the mobile computer device over the set of stairs 852 and the walkway 854, in the x-, y- and z-directions, beginning from an origin at $(x_0, y_0, z_0)$ at time $t_0$, and proceeding up the set of stairs 852 from time $t_0$ to time $t_3$ in the y-direction and the z-direction before turning right at time $t_4$ and proceeding along the walkway 854 in the x-direction from time $t_4$ through time $t_8$. The map is defined by areas of uncertainty with regard to the position of the mobile computer device and the sensed positions at times $t_0$ through $t_8$.

Thus, the surface features 850 of the area shown in FIG. 8A, viz., the set of stairs 852 and the walkway 854 may be mapped or graphed as functions of space in the x-, y- and z-directions, as is shown in FIG. 8E, using positions of a mobile computer device as determined based on the net accelerations, velocities or orientations of the mobile computer device obtained from one or more sensors (e.g., accelerometers, gyroscopes or compasses). As is shown in FIG. 8E, the surface features 850 may be mapped or graphed according to areas of uncertainty at each of the relevant times $t_0$ through $t_8$. Once a map or a graph of surface features has been defined, information regarding such surface features may be utilized for any purpose, including for the purposes of planning travel across or along such surface features in the future. Additionally, a mapped or graphed set of surface features may be refined based on future travel across the same surface features, either by the original user of the mobile computer device, or by any number of users of other mobile computer devices in the future.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of embodiments disclosed herein show the travel of users of mobile computer devices outdoors and on foot, the systems and methods of the present disclosure are not so limited, and may be used within one or more vehicles or indoors, where quality or strength of communication between a GPS sensor and one or more GPS satellites may be limited. In one such embodiment, the systems and methods of the present disclosure may be used in a subterranean environment (e.g., within a subway system or other underground network), where no connectivity between a mobile computer device and a location provider, such as a GPS network or cellular telephone network, is available.

Moreover, although some of the embodiments disclosed herein show the use of handheld computer device by one or more human users, the systems and methods of the present disclosure are not so limited. For example, the systems and methods disclosed herein may be provided in connection with the operation of one or more vehicles and used to estimate or confirm positions of such vehicles based on data obtained from one or more sensors, or to map or graph surface features (e.g., potholes or other discontinuities in one or more roads or paths) traveled upon by such vehicles. Likewise, although some of the embodiments disclosed herein reference the identification of an estimated position of a computer device through the use of a hardware component such as a GPS sensor or a software component such as a triangulation module, the systems and methods disclosed herein are not so limited. Rather, an estimated position may be identified by any means, such an anticipated address or location where the mobile computer device is expected to be located, or may be located, and the estimated position may be verified in accordance with one or more of the systems and methods disclosed herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5 and 7 the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A mobile computer system comprising:
a Global Positioning System sensor;
an accelerometer; and
a computing device in communication with the Global Positioning System sensor and the accelerometer,
wherein the computing device is configured to at least:
   determine an estimated position of the mobile computer system using the Global Positioning System sensor, wherein the estimated position has a predetermined degree of tolerance;
   determine an acceleration of the mobile computer system at a first time based at least in part on information received from the accelerometer;
   determine a first plurality of surface features in a vicinity of the estimated position of the mobile computer system at the first time;
   select a first surface feature from the first plurality of surface features in the vicinity of the estimated position of the mobile computer system at the first time based at least in part on the acceleration of the mobile computer system;
   determine whether the first surface feature is within the predetermined degree of tolerance of the estimated position of the mobile computer system;
   confirm a position of the mobile computer system at the first time as the estimated position of the mobile computer system if the first surface feature is within the predetermined degree of tolerance of the estimated position of the mobile computer system; and
   confirm the position of the mobile computer system as a location of the first surface feature if the first surface feature is not within the predetermined degree of tolerance of the estimated position of the mobile computer system.

2. The mobile computer system of claim 1, further comprising at least one of a gyroscope or a compass,
wherein the acceleration of the mobile computer system is determined based at least in part on at least one of information received from the gyroscope or information received from the compass.

3. The mobile computer system of claim 1, wherein the computing device is further configured to at least:
   estimate a velocity of the mobile computer system at the first time based at least in part on the acceleration of the mobile computer system at the first time;
   determine an estimated position of the mobile computer system at a second time based at least in part on the estimated velocity, wherein the estimated position has a predetermined degree of tolerance;
   determine a second plurality of surface features in a vicinity of the estimated position of the mobile computer system at the second time;
   select a second surface feature from the second plurality of surface features in the vicinity of the estimated position of the mobile computer system at the second time based at least in part on the estimated velocity of the mobile computer system;
   determine whether the second surface feature is within the predetermined degree of tolerance of the estimated position of the mobile computer system at the second time;
   confirm a position of the mobile computer system at the second time as the estimated position of the mobile computer system if the second surface feature is within the predetermined degree of tolerance of the estimated position of the mobile computer system; and
   confirm the position of the mobile computer system as a location of the second surface feature if the second surface feature is not within the predetermined degree of tolerance of the estimated position of the mobile computer system.

4. The mobile computer system of claim 1, wherein the first plurality of surface features comprises at least one of a stair, a ramp, a curb, a hill, a road, a walkway, a substantially sloped surface or a substantially flat surface.

5. The mobile computer system of claim 1, wherein the first surface is one of at least one stair, a ramp, a curb, a hill, a road, a walkway, a substantially sloped surface or a substantially flat surface.

6. A method comprising:
receiving, by a Global Positioning System transceiver of a first mobile device, at least one position signal over a Global Positioning System network at a first time, wherein the Global Positioning System network comprises at least one Global Positioning System satellite;
determining, by at least one computer processor of the first mobile device, a first estimated position of the first mobile device at the first time based at least in part on the at least one position signal, wherein the first estimated position has a first predetermined degree of tolerance;
receiving, by at least a first sensor of the first mobile device, at least a first signal at approximately the first time;
determining, by the at least one computer processor of the first mobile device, at least a first acceleration of the first mobile device at approximately the first time based at least in part on the first signal;
determining, by the at least one computer processor of the first mobile device, whether the first acceleration is consistent with at least one surface feature within the first predetermined degree of tolerance of the first estimated position; and
in response to determining that the first acceleration is consistent with the at least one surface feature within the first predetermined degree of tolerance of the first estimated position,
confirming that the first mobile device was at the first estimated position at the first time.

7. The method of claim 6, wherein the first sensor is an accelerometer,
wherein the first signal corresponds to a first change in velocity experienced by the accelerometer in a first direction at the first time, and
wherein determining at least the first acceleration of the first mobile device at approximately the first time comprises:
determining, by the at least one computer processor of the first mobile device, the first acceleration of the first mobile device based at least in part on the first change in velocity.

8. The method of claim 7, wherein receiving at least the first signal at approximately the first time comprises:
receiving, by at least the first sensor of the first mobile device, a second signal corresponding to a second change in velocity experienced by the accelerometer in a second direction at the first time; and
receiving, by at least the first sensor of the first mobile device, a third signal corresponding to a third change in velocity experienced by the accelerometer in a second direction at the first time, and
wherein determining at least the first acceleration of the first mobile device at approximately the first time comprises:

determining, by the at least one computer processor of the first mobile device, the first acceleration of the first mobile device based at least in part on the first change in velocity, the second change in velocity and the third change in velocity,
wherein the first direction is vertical,
wherein the second direction is forward and horizontal, and
wherein the third direction is lateral and horizontal.

9. The method of claim 7, wherein the first mobile device further comprises a gyroscope, and
wherein determining at least the first acceleration of the first mobile device at approximately the first time comprises:
determining, by the at least one computer processor of the first mobile device, at least one of an angular velocity or an angular orientation of the first mobile device at the first time using the gyroscope,
wherein the first acceleration of the first mobile device is determined based at least in part on the angular velocity or the angular orientation of the first mobile device.

10. The method of claim 7, wherein the first mobile device further comprises a compass, and
wherein determining at least the first acceleration of the first mobile device at approximately the first time comprises:
determining, by the at least one computer processor of the first mobile device, at least one of a direction of motion of the first mobile device at the first time using the compass,
wherein the first acceleration of the first mobile device is determined based at least in part on the direction of motion of the first mobile device.

11. The method of claim 6,
determining, by the at least one computer processor of the first mobile device, at least one dimension associated with the at least one surface feature;
defining, by the at least one computer processor of the first mobile device, a second predetermined degree of tolerance of the first position based at least in part on the at least one dimension; and
storing the first estimated position in association with the second predetermined degree of tolerance in at least one data store.

12. The method of claim 6, wherein determining whether the first acceleration is consistent with the at least one surface feature within the first predetermined degree of tolerance of the first estimated position comprises:
identifying, by the at least one computer processor of the first mobile device, a plurality of surface features within a vicinity of the first estimated position, wherein the plurality of surface features includes the at least one surface feature; and
selecting, by the at least one computer processor of the first mobile device, one of the plurality of surface features based at least in part on the first acceleration of the mobile device,
wherein the selected one of the plurality of surface features is the at least one surface feature.

13. The method of claim 12, wherein the selected one of the plurality of surface features is one of at least one stair, a ramp, a curb, a hill, a road, a walkway, a substantially sloped surface or a substantially flat surface.

14. The method of claim 6, further comprising:
determining, by computer processors associated with each of a plurality of mobile devices, accelerations of the mobile devices at a plurality of times based at least in part on signals received from accelerometers associated with each of the plurality of mobile devices, wherein each of the plurality of times precedes the first time;

providing, by each of the plurality of computer processors, information regarding the accelerations of the mobile devices at the plurality of times to at least one computer server operating a surface feature identification engine over a network;

deriving, by the surface feature identification engine, information regarding the velocities of the mobile devices at the plurality of times based at least in part on the information regarding the accelerations of the mobile devices;

deriving, by the surface feature identification engine, information regarding the positions of the mobile devices at the plurality of times based at least in part on the information regarding the velocities of the mobile devices;

defining, by the surface feature identification engine, a map based at least in part on the information regarding the accelerations, the information regarding the velocities and the information regarding the positions, wherein the map comprises information regarding a plurality of surface features within a defined area; and storing, by the surface feature identification engine, the map in at least one data store, wherein determining whether the first acceleration is consistent with the at least one surface feature within the first predetermined degree of tolerance of the first estimated position comprises:

receiving, by the at least one computer processor of the first mobile device, at least a portion of the map from the at least one data store over the network;

determining, by the at least one computer processor of the first mobile device, that the defined area of the map includes the first estimated position; and selecting, by the at least one computer processor of the first mobile device, one of the plurality of surface features within the defined area based at least in part on the first acceleration of the first mobile device at approximately the first time, wherein the at least one surface feature is the selected one of the plurality of surface features.

15. The method of claim 6, further comprising:

storing a pattern of acceleration associated with a triggering event in at least one data store of the first mobile device prior to the first time;

receiving, by at least the first sensor of the first mobile device, at least a second signal prior to the first time;

determining, by the at least one computer processor of the first mobile device, at least a second acceleration of the first mobile device at approximately the second time based at least in part on the second signal prior to the first time;

determining, by the at least one computer processor of the first mobile device, whether the second acceleration is consistent with the pattern of acceleration associated with the triggering event prior to the first time;

in response to determining that the second acceleration is consistent with the pattern of acceleration associated with the triggering event prior to the first time, determining that the triggering event occurred prior to the first time; and receiving, by the Global Positioning System transceiver of the first mobile device, the at least one position signal over the Global Positioning System network at the first time.

16. The method of claim 15, wherein the triggering event is a descent from a predetermined automobile, and wherein the pattern of acceleration is consistent with the descent from the predetermined automobile.

17. The method of claim 6, in response to determining that the first acceleration is not consistent with the at least one surface feature within the first predetermined degree of tolerance of the first estimated position, determining, by the at least one computer processor, that the first acceleration is consistent with a surface feature outside of the first predetermined degree of tolerance;

determining, by the at least one computer processor, a location of the surface feature outside of the first predetermined degree of tolerance; and determining, by the at least one computer processor, a second estimated position of the first mobile device at the first time based at least in part on the location of the surface feature outside of the first predetermined degree of tolerance.

18. A method comprising:

receiving, by a cellular telephone transceiver of a first mobile device, at least three cellular telephone signals over a cellular telephone network at a first time;

determining, by at least one computer processor of the first mobile device, a first estimated position of the first mobile device at the first time based at least in part on a triangulation of the at least three cellular telephone signals;

receiving, by at least a first sensor of the first mobile device, at least a first signal at approximately the first time;

determining, by the at least one computer processor of the first mobile device, at least a first acceleration of the first mobile device at approximately the first time based at least in part on the first signal;

determining, by the at least one computer processor of the first mobile device, whether the first acceleration is consistent with at least one surface feature within the first predetermined degree of tolerance of the first estimated position; and in response to determining that the first acceleration is consistent with the at least one surface feature within the first predetermined degree of tolerance of the first estimated position, confirming that the first mobile device was at the first estimated position at the first time.

19. A method comprising:

receiving, by a mobile computer device over a network, information regarding a location for a delivery of an item, wherein the mobile computer device comprises a display, a Global Positioning System sensor and an accelerometer;

identifying, by the mobile computer device, digital terrain data describing at least one surface feature associated with the location;

causing at least some of the information regarding the location to be displayed on the display, wherein the at least some of the information regarding the location comprises an address of the location;

receiving, by the mobile computer device, at least one position signal from at least one Global Positioning System satellite;

determining, by the mobile computer device, an estimated position of the mobile computer device and an area of uncertainty associated with the estimated position of the mobile computer device based at least in part on the at least one position signal;

determining, by the mobile computer device, that the location for the delivery of the item is within the area of uncertainty associated with the estimated position of the mobile computer device;

determining, by the mobile computer device, an acceleration of the mobile computer device;

determining, by the mobile computer device, whether the acceleration is consistent with the digital terrain data describing the at least one surface feature associated with the location; and in response to determining that the acceleration is consistent with the digital terrain data describing the at least one surface feature associated with the location, confirming, by the mobile computer device, that the mobile computer device is at the location.

20. The method of claim 19, wherein the location comprises a first entryway, a first surface feature associated with the first entryway, a second entryway and a second surface feature associated with the second entryway, wherein the at least some of the information identifying the location comprises an identifier of the first entryway for the delivery of the item, wherein the digital terrain data describes at least the first surface feature and the second surface feature, wherein determining whether the acceleration is consistent with the digital terrain data describing the at least one surface feature associated with the location comprises:

determining, by the mobile computer device, whether the acceleration is consistent with the digital terrain data describing the first entryway, and wherein confirming that the mobile computer device is at the location comprises:

causing information indicating that the mobile computer device is at the first entryway to be displayed on the display.

\* \* \* \* \*